(12) United States Patent
Gilmore

(10) Patent No.: US 11,562,721 B2
(45) Date of Patent: Jan. 24, 2023

(54) WIRELESS MULTI-STRING TUNER FOR STRINGED INSTRUMENTS AND ASSOCIATED METHOD OF USE

(71) Applicant: Don Gilmore Devices, LLC, Kansas City, MO (US)

(72) Inventor: Donald Allen Gilmore, Kansas, MO (US)

(73) Assignee: DON GILMORE DEVICES, LLC, Kansas City, MO (US)

( * ) Notice: Subject to any disclaimer, the term of this patent is extended or adjusted under 35 U.S.C. 154(b) by 105 days.

(21) Appl. No.: 17/200,206

(22) Filed: Mar. 12, 2021

(65) Prior Publication Data

US 2021/0287640 A1    Sep. 16, 2021

Related U.S. Application Data

(60) Provisional application No. 63/066,516, filed on Aug. 17, 2020, provisional application No. 62/989,389, filed on Mar. 13, 2020.

(51) Int. Cl.

| | |
|---|---|
| *G10G 7/02* | (2006.01) |
| *G10D 3/14* | (2020.01) |
| *G10H 1/00* | (2006.01) |
| *H05B 47/105* | (2020.01) |
| *G06F 1/16* | (2006.01) |

(52) U.S. Cl.
CPC ............ *G10G 7/02* (2013.01); *G10D 3/14* (2013.01); *G10H 1/0008* (2013.01); *H05B 47/105* (2020.01); *G06F 1/163* (2013.01); *G10H 2210/066* (2013.01); *G10H 2220/091* (2013.01)

(58) Field of Classification Search
CPC .......... G10G 7/02; G10G 3/14; H05B 47/105; G06F 1/163
See application file for complete search history.

(56) References Cited

U.S. PATENT DOCUMENTS

| | | |
|---|---|---|
| 3,795,169 A | 3/1974 | Belcher |
| 3,901,120 A | 8/1975 | Youngquist |
| 4,023,462 A | 5/1977 | Denov et al. |
| 4,061,071 A * | 12/1977 | Cameron ............... G10G 7/02 984/260 |
| 4,271,746 A | 6/1981 | Dobbie |
| 4,297,938 A | 11/1981 | Kirby |

(Continued)

FOREIGN PATENT DOCUMENTS

WO    1981002355 A1    8/1981

*Primary Examiner* — Robert W Horn
(74) *Attorney, Agent, or Firm* — McKee, Voorhees & Sease, PLC

(57) ABSTRACT

A stringed instrument tuner that senses the vibration of all the strings of the instrument independently and simultaneously via ultraviolet reflective light sensors that are immune to interference from ambient alternating-current lighting. The pitches of the strings are then measured continuously in real-time and transmitted wirelessly to a receiver that simultaneously graphically displays how far out-of-tune all of the strings are so that the musician can instantly see which strings need tuning and tune them quickly. The receiver may be a smartphone, smartwatch, smart glasses, computer, self-tuning system, or a dedicated wearable receiver-display unit.

17 Claims, 14 Drawing Sheets

(56) References Cited

U.S. PATENT DOCUMENTS

| | | | | |
|---|---|---|---|---|
| 4,320,689 A * | 3/1982 | Pogoda | | G10D 3/173 |
| | | | | 84/322 |
| 4,321,463 A | 3/1982 | Stecher | | |
| 4,327,623 A | 5/1982 | Mochida et al. | | |
| 4,365,537 A | 12/1982 | Pogoda | | |
| 4,688,460 A * | 8/1987 | McCoy | | G10H 3/181 |
| | | | | 84/743 |
| 4,730,530 A * | 3/1988 | Bonanno | | G10H 3/18 |
| | | | | 984/367 |
| 4,815,353 A * | 3/1989 | Christian | | G10H 3/181 |
| | | | | 984/368 |
| 5,012,086 A * | 4/1991 | Barnard | | G01V 8/20 |
| | | | | 250/237 R |
| 5,065,660 A | 11/1991 | de Buda | | |
| 5,214,232 A * | 5/1993 | Iijima | | G10H 3/181 |
| | | | | 84/723 |
| 5,343,793 A | 9/1994 | Pattie | | |
| 5,388,496 A | 2/1995 | Miller et al. | | |
| 5,567,902 A * | 10/1996 | Kimble | | G10H 1/344 |
| | | | | 356/28 |
| 5,756,913 A | 5/1998 | Gilmore | | |
| 5,959,229 A | 9/1999 | Walley | | |
| 5,977,443 A | 11/1999 | Jansen | | |
| 5,977,467 A * | 11/1999 | Freeland | | G10G 7/02 |
| | | | | 84/297 S |
| 6,066,790 A * | 5/2000 | Freeland | | G10H 3/125 |
| | | | | 84/453 |
| 6,437,226 B2 * | 8/2002 | Oudshoorn | | G10D 3/14 |
| | | | | 84/454 |
| 6,479,738 B1 | 11/2002 | Gilmore | | |
| 6,559,369 B1 | 5/2003 | Gilmore | | |
| 6,580,024 B2 | 6/2003 | Skubic | | |
| 7,049,502 B2 | 5/2006 | Taku et al. | | |
| 7,285,710 B1 | 10/2007 | Wallace | | |
| 7,507,891 B2 * | 3/2009 | Lau | | G10G 7/02 |
| | | | | 84/723 |
| 7,663,043 B2 | 2/2010 | Park | | |
| 7,678,982 B2 | 3/2010 | Adams | | |
| 7,692,085 B2 | 4/2010 | Adams | | |
| 7,763,789 B2 * | 7/2010 | Clark | | G01H 9/00 |
| | | | | 84/654 |
| 7,786,373 B2 | 8/2010 | Adams | | |
| 7,875,784 B2 | 1/2011 | Moyle et al. | | |
| 7,977,566 B2 * | 7/2011 | Haddad | | G10H 1/0083 |
| | | | | 84/724 |
| 8,022,285 B2 | 9/2011 | Zhang | | |
| 8,110,733 B2 | 2/2012 | D'Arco | | |
| 8,143,783 B2 | 3/2012 | Park et al. | | |
| 8,173,887 B2 * | 5/2012 | Sullivan | | G10H 1/342 |
| | | | | 84/724 |
| 8,334,449 B2 * | 12/2012 | Nielsen | | G10G 7/02 |
| | | | | 84/454 |
| 8,334,493 B2 | 12/2012 | Yokogawa | | |
| 8,338,683 B2 * | 12/2012 | Nielsen | | G10G 7/02 |
| | | | | 84/477 R |
| 8,350,141 B2 | 1/2013 | Nielsen et al. | | |
| 8,373,053 B2 | 2/2013 | Nielsen et al. | | |
| 8,519,252 B2 * | 8/2013 | Haddad | | G10H 3/06 |
| | | | | 84/724 |
| 8,809,661 B2 | 8/2014 | Seno et al. | | |
| 8,811,121 B2 | 8/2014 | Balli | | |
| 9,047,851 B2 * | 6/2015 | Haddad | | G10H 1/0553 |
| 9,064,479 B2 | 6/2015 | Yui et al. | | |
| 9,070,350 B2 | 6/2015 | Nielsen et al. | | |
| 9,076,416 B2 | 7/2015 | Nielsen et al. | | |
| 9,117,433 B2 | 8/2015 | Yui et al. | | |
| 9,240,170 B2 | 1/2016 | Chekardzhikov | | |
| 9,548,044 B2 | 1/2017 | Chekardzhikov | | |
| 9,633,637 B1 | 4/2017 | Hood et al. | | |
| 10,482,859 B1 * | 11/2019 | Horban | | G10H 1/342 |
| 2005/0262988 A1 * | 12/2005 | Yurkovsky | | G10G 7/02 |
| | | | | 84/455 |
| 2011/0197743 A1 * | 8/2011 | Potter | | G10G 7/02 |
| | | | | 84/730 |
| 2021/0287640 A1 * | 9/2021 | Gilmore | | G10H 1/44 |

* cited by examiner

FIG. 3
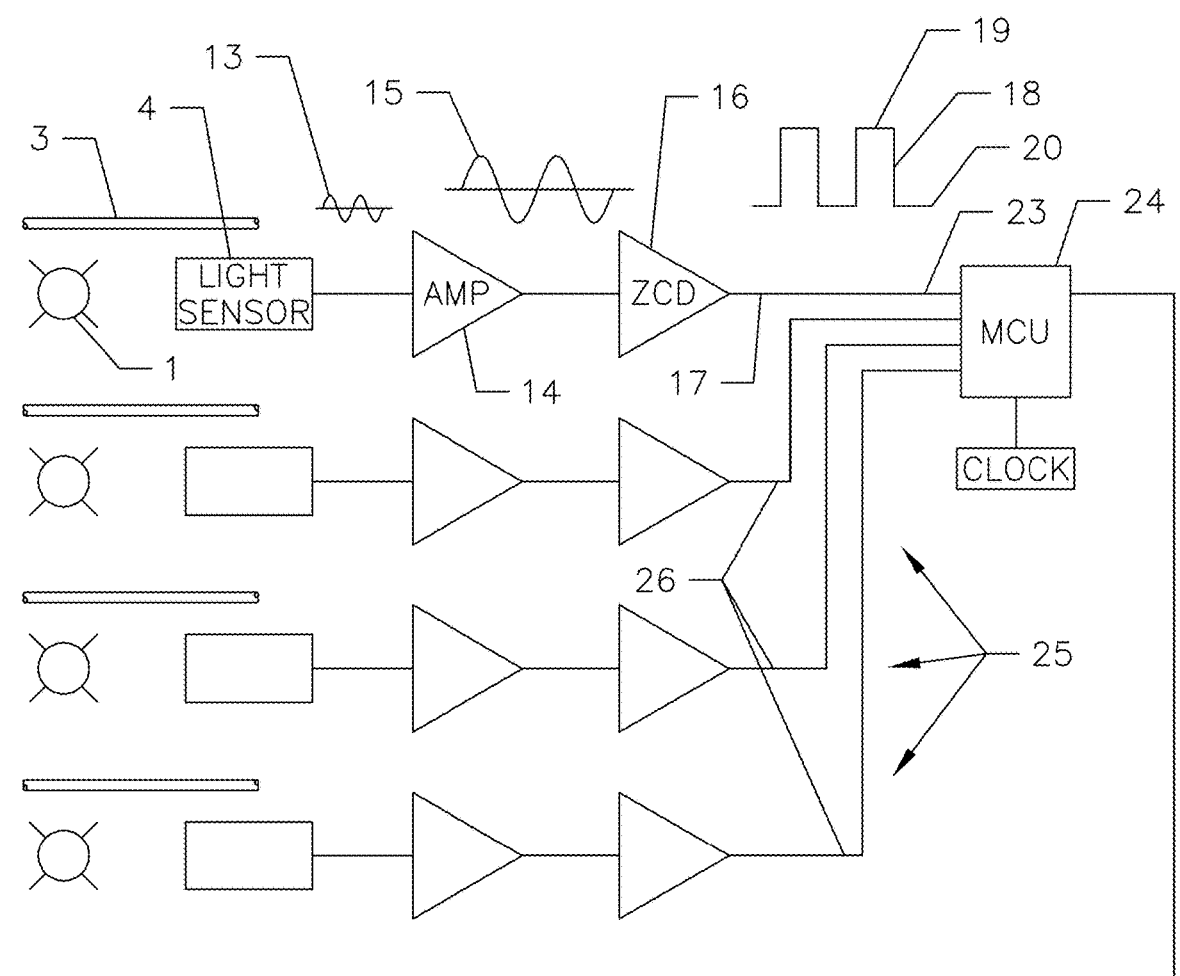
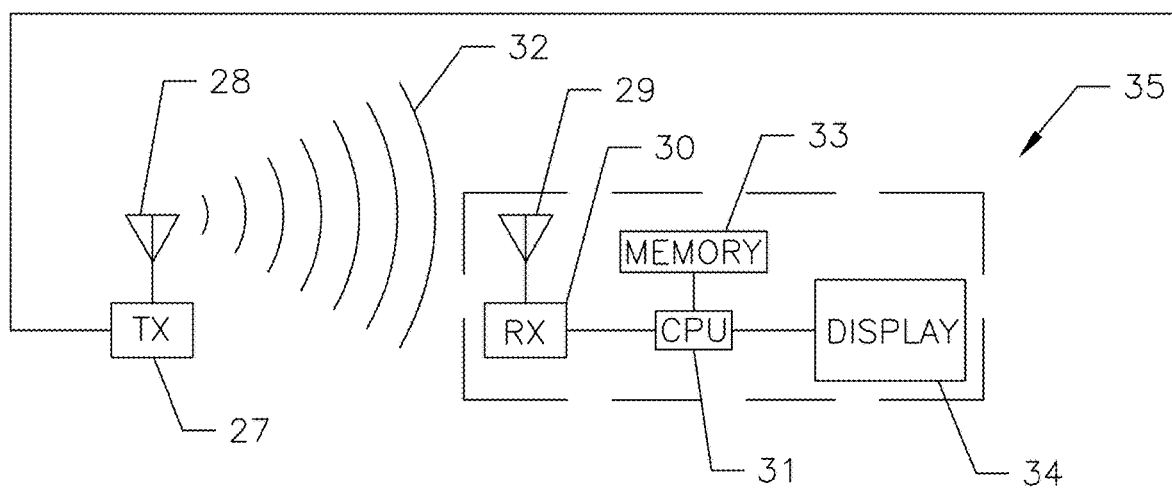

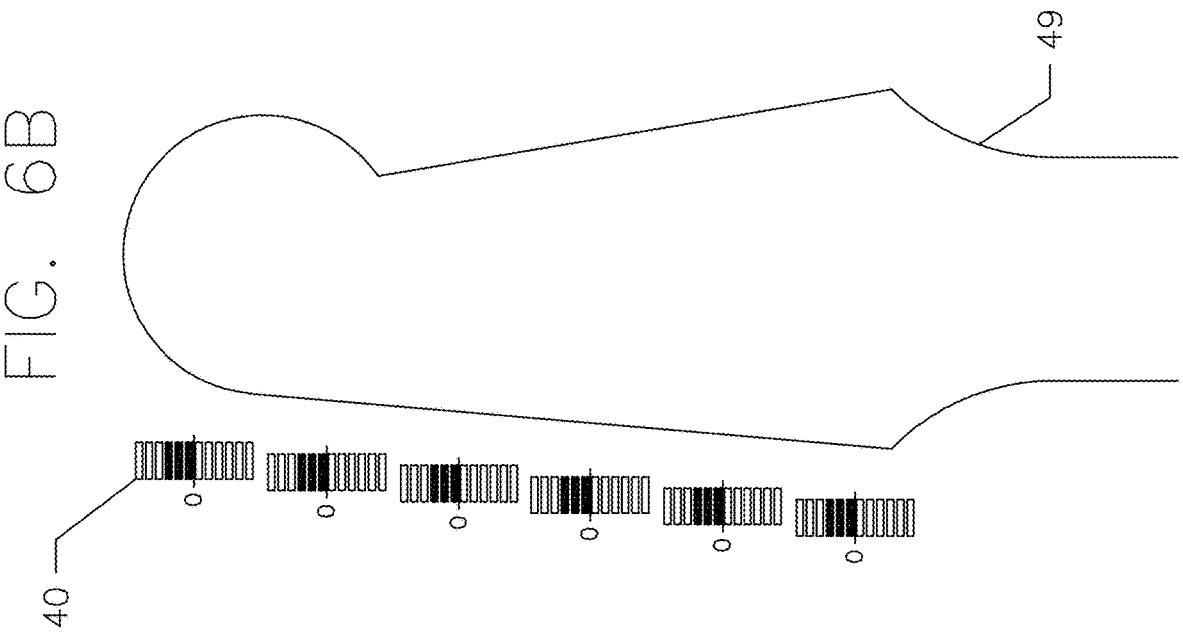
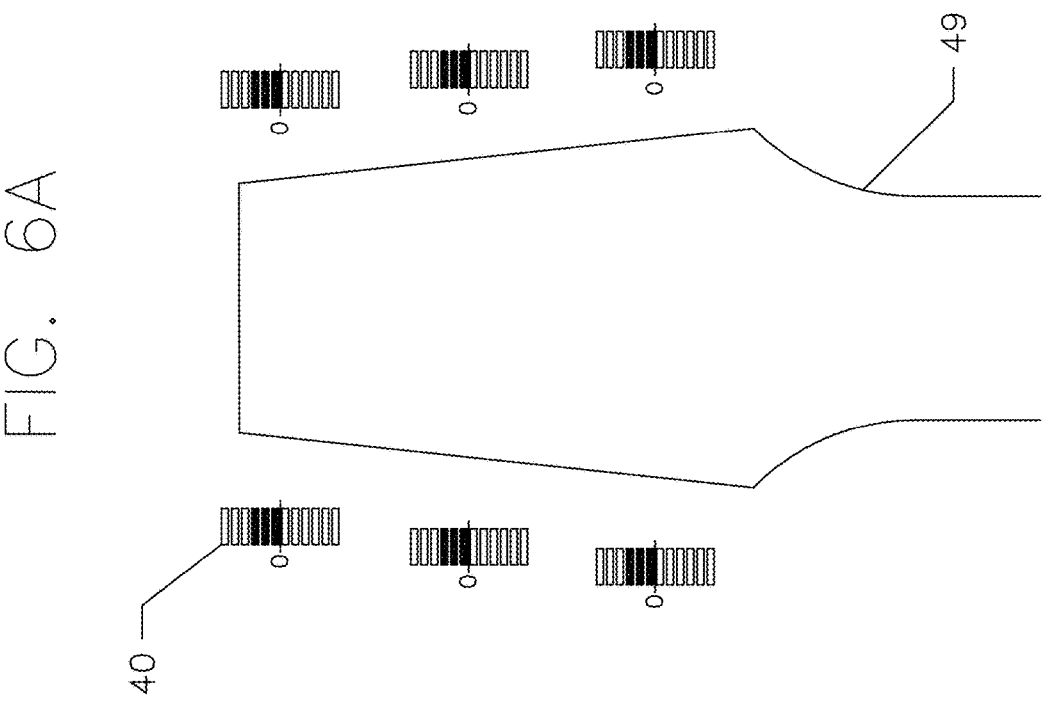

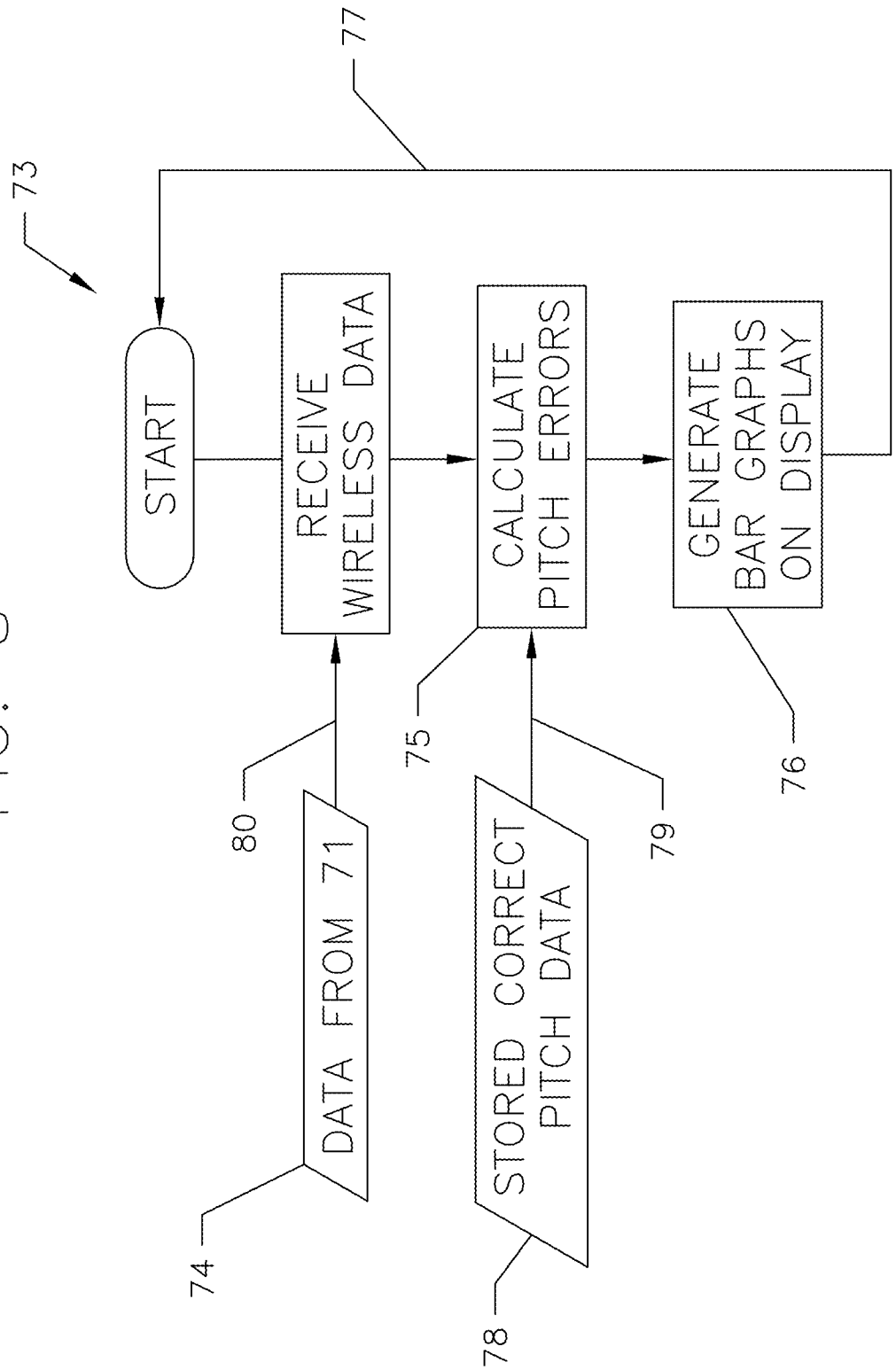

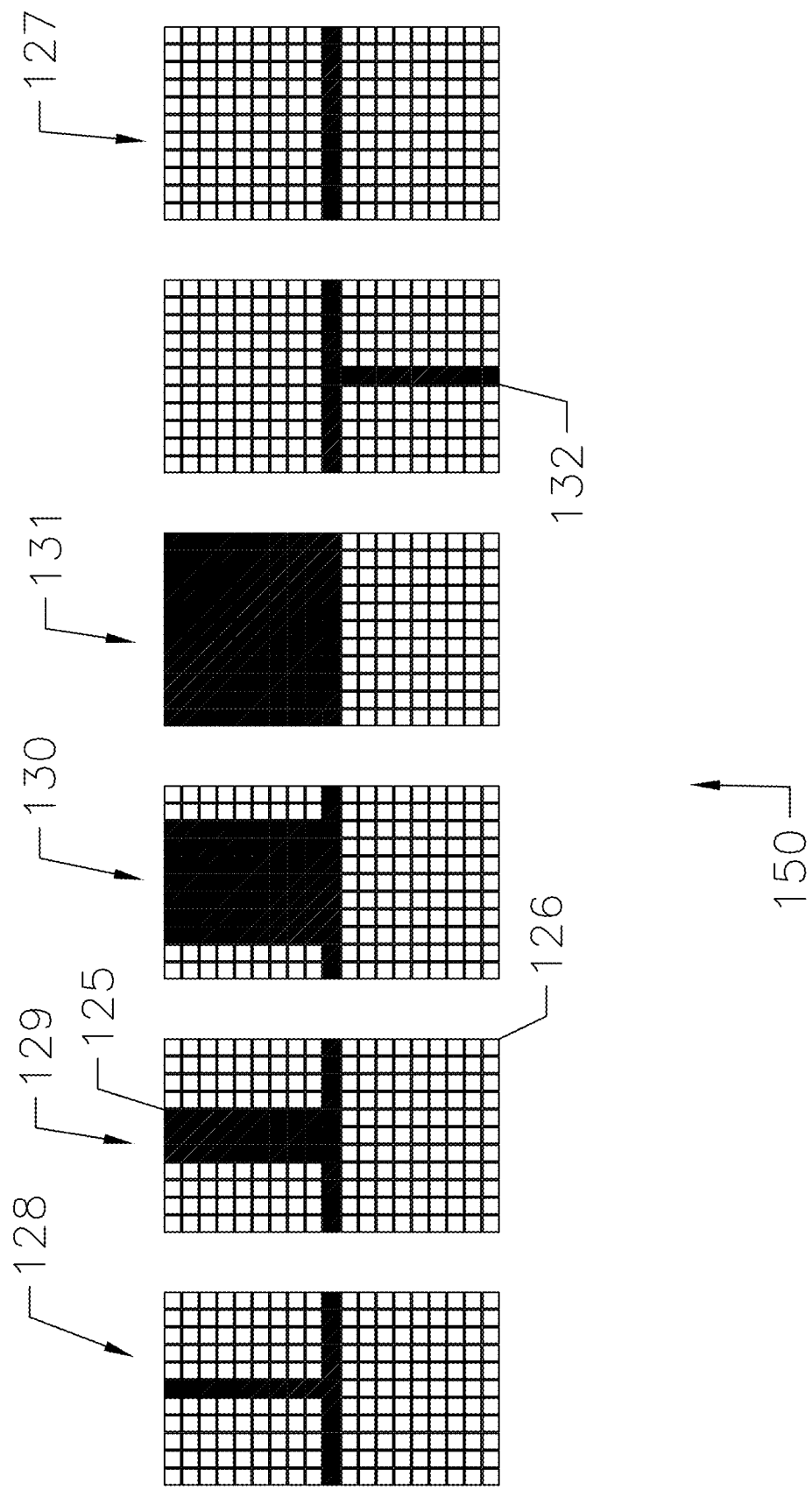

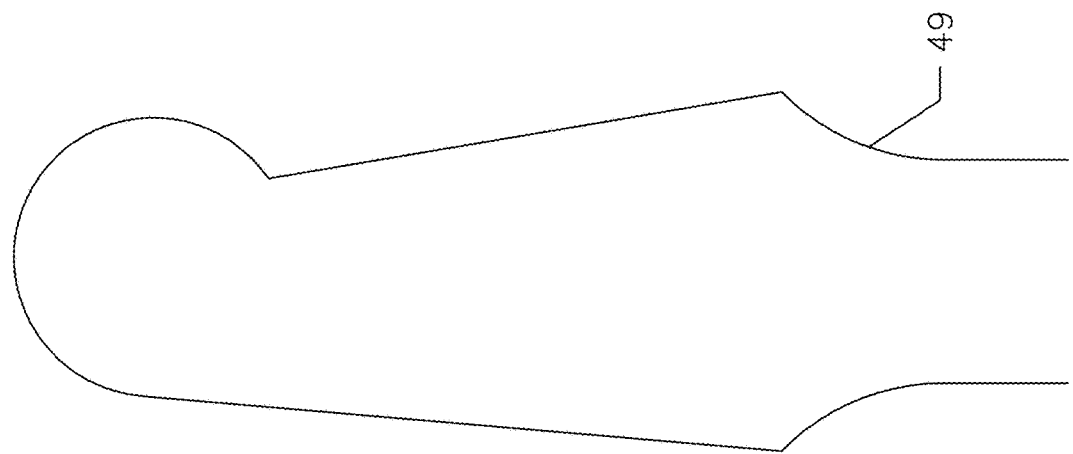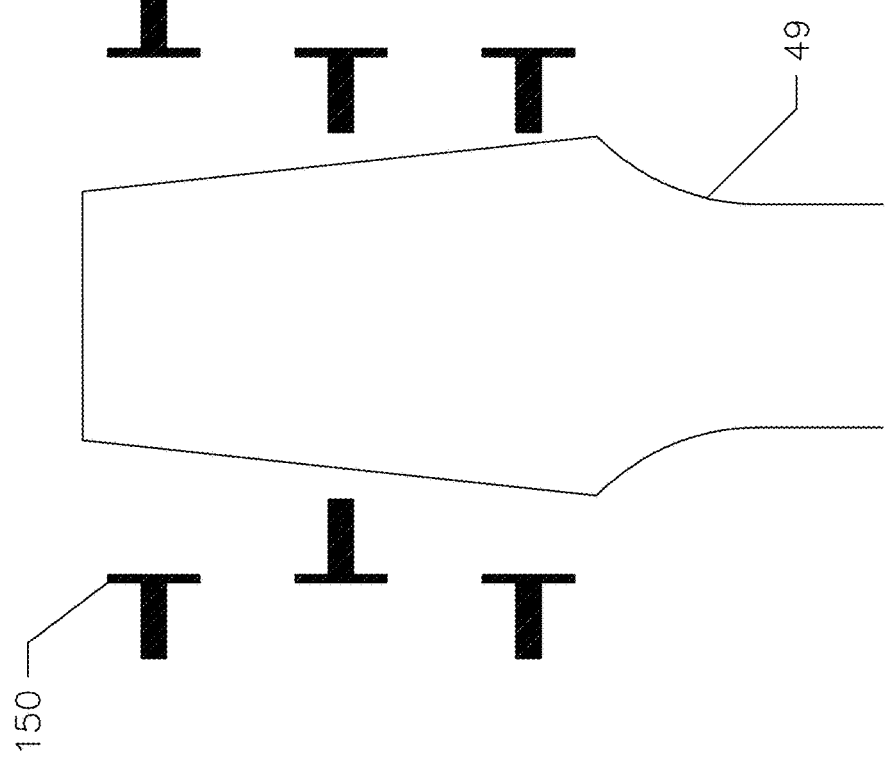

WIRELESS MULTI-STRING TUNER FOR STRINGED INSTRUMENTS AND ASSOCIATED METHOD OF USE

CROSS-REFERENCE TO RELATED APPLICATIONS

This patent application claims the benefit of priority to (i) U.S. Provisional Patent Application Ser. No. 62/989,389, filed Mar. 13, 2020, and entitled "Wireless Multi-String Tuner for Stringed Instruments and Associated Method of Use," and (ii) U.S. Provisional Patent Application Ser. No. 63/066,516, filed Aug. 17, 2020, and entitled "Wireless Multi-String Tuner for Stringed Instruments and Associated Method of Use," both of which are incorporated herein by reference in their entireties.

STATEMENT REGARDING FEDERALLY SPONSORED RESEARCH OR DEVELOPMENT

Not Applicable.

APPENDIX

Not Applicable.

BACKGROUND

Stringed instruments, such as guitars, violins, banjos, etc., are often tuned with the aid of an electronic device such as an electronic tuning device (e.g., electronic tuner). A conventional electronic tuning device is usually a self-contained device that detects the vibration of a single string of the instrument when plucked by the musician, measures its pitch, calculates the error of this pitch based on what the correct frequency for that string should be, and then displays the error information in some fashion so that the musician can manually turn tuning pegs of the instrument being tuned so as to bring the instrument into tune.

The vibration of the string is usually detected in one of several ways: with a microphone by listening to actual sound in the air, through vibration detection from the body of the instrument, or by tapping an analog electronic signal directly from an electronically amplified instrument. The physical embodiment of such conventional electronic tuning devices usually comprises of an enclosed electronic circuit with an integral display for a user to view if a particular string needs to be tuned.

Each of the above-noted conventional electronic tuning devices has respective limitations. If the electronic tuning device uses a microphone for sensing, it must be located close enough to the instrument or, in the case of an electronically amplified instrument, close enough to the speakers of its amplifier to detect the sound. Further, the environment must be relatively quiet to avoid interference from background noise, crowd noise and/or other instruments. This is particularly difficult to achieve when a musician is on stage. This method also requires that individual strings be plucked one at a time, as only one string can be evaluated at a time. Multiple strings played together would be difficult or impossible to evaluate. They could be separated by electronic filters, but would still have to be evaluated one at a time. In addition, to tune the entire instrument, all of the strings must be plucked individually to determine whether they need tuning or not. Having to evaluate strings that are already in tune wastes time.

If the electronic tuning device operates by detecting vibrations, it must be physically connected to the body of the instrument. Devices like this are often clamped or otherwise attached to the instrument to leave the musician's hands free to pluck a string and turn the corresponding tuning peg while watching the display of the device. However, as in the case of microphone-detected sound, the musician can thus only observe or display the pitch information for one string at a time. Such a vibration-detecting device must be attached to the instrument to function correctly and is best located at the top of the instrument head so that it can be seen clearly while tuning. The device must be attached and removed with each tuning, or left attached to the instrument while playing where it is distracting, disrupts the balance of the instrument and renders the device susceptible to inadvertent damage, loss, etc., and, as with the microphone-detected devices, only one note at a time may be tuned.

If the device taps the signal from an electronically amplified instrument, it must be connected via an electrical cord or cords to the instrument and/or its amplifier. This limits where the device can be located, since it is tethered by the cord(s) yet must be large and bright enough and in close enough proximity to the musician that the musician can see its display. Devices like this are usually located on the floor, near the musician's feet and among the various other electronic cords, with the display facing upward. This puts the device in a high-traffic area where the unit is more likely to become damaged or lost from view.

SUMMARY OF THE INVENTION

This section provides a general summary of the disclosure, and is not a comprehensive disclosure of its full scope or all of its features.

The present application relates to an apparatus for aid in tuning a stringed musical instrument, including but not limited to a small (e.g., compact), self-contained unit that attaches to the body of a stringed instrument, such as under the strings of the instrument. The apparatus comprises of an outer case, which contains an electronic circuit, and, for example, a battery or batteries that provide electrical power for the device. These batteries may be primary batteries or secondary, rechargeable batteries, in which case an integral charging (aka power) jack/port is provided for charging with a power source such as a wall adapter, USB cord or other external power source or the like. The apparatus of the present application can be attached to the instrument via an ordinary, removable, pressure-sensitive adhesive holding it securely, while still allowing for the apparatus to be removed without harming the instrument. The apparatus could alternately be attached to the instrument by other attachment means including but not limited to permanent glue, magnets, suction cups, elastic straps, spring clamps, c-clamps, nails/ brads, screws and/or hook-and-loop fasteners (such as Velcro), or any combination thereof. The apparatus is small and remains removably or permanently attached to the instrument, under the strings of the instrument, without inconveniencing the musician in any way. This represents a substantial improvement over conventional electronic tuning devices.

The tuning apparatus of the present application may include a circuit board including a plurality of sensors thereon, with, for example, one sensor for each string of the instrument, sensing the vibration of each string independently. These sensors can be phototransistors or photodiodes, which can be designed to detect ultraviolet (UV) light only. A light source is also provided on the circuit board, which emits ultraviolet light. As both incandescent and fluorescent ambient light sources emit only minuscule amounts of ultraviolet light, with most of their spectrum being within the visible and infrared wavelengths of light, the sensors of the present application sense only the light from the UV emitters, thereby disregarding and/or otherwise excluding the ambient light. The UV light source may be in the form of a light emitting diode (LED) or any other common type of UV source and may be in the form of either a single UV source that illuminates all the instrument strings simultaneously, or individual UV sources that illuminate each string respectively. The UV emitted from the source(s) is reflected from a surface of the instrument's strings back toward the UV sensors. The sensors are sensitive to this reflected UV light and produce an electrical voltage (in the case of a phototransistor sensor) or an electrical current (in the case of a photodiode sensor) in a circuit of the circuit board that is proportional to the amount of light detected by the sensor. When a string is set into vibrating motion by plucking, the amount of light reflected back onto the sensor fluctuates with the varying distance and position of the string as it vibrates. This fluctuation in light intensity is transduced by the sensor into a varying electrical voltage or current, depending on the type of sensor that is used. There can be a case (e.g., housing) that encloses the circuit. The case may include slots that are so shaped as to shield the sensors from the reflections from other strings so that each sensor can only detect the light reflecting from its corresponding string above.

In an alternative embodiment, the case may not include slots that are so shaped as to shield the sensors from the reflections from other strings so that each sensor can only detect the light reflecting from its corresponding string above. When placing the reflective sensors under the instrument strings it is necessary that they be located far enough away from the strings so as not to interfere with the playing of the instrument, yet close enough to sense the string's vibration as the amplitude of the plucked string decays and for a time long enough to be practical for executing the tuning procedure without requiring the constant strumming of the strings. For this reason, prismatic lenses may be located over each sensor. These lenses are made from a solid, transparent material such as acrylic or polycarbonate plastic, glass, epoxy, or any other optically clear material and shaped in the form of an isosceles triangle, symmetric about the plane passing through the center line of the object string and the center of the sensor. The lenses serve two purposes. Firstly, they converge reflected light from the object string directly overhead by refracting the light inward, intensifying the light contacting the photosensor and increasing its effect. This allows the string to be detected from farther away and with smaller vibrations so that the signal can be accurately measured over a longer decay period. The second purpose of the prismatic lenses is to reject light reflected from adjacent strings that would interfere with the signal from the object string. Light reflecting from adjacent strings enters the prismatic lens from a more oblique angle than light reflected from the object string directly above. Consequently, though the light is refracted downward toward the sensor as it enters the prism, when it passes on to the bottom inner surface of the prism, nearest the sensor, and attempts to exit, the light is reflected back into the prism and does not pass through to the sensor. This is due to the fact that the light strikes the inner surface of the lens at an angle greater than the so-called critical angle of the refractive material. The angle of refraction $\varphi_a$ of a transparent solid is related to the angle of incidence $\varphi_0$ by the formula $$\sin \varphi_0 = n_a \sin \varphi_a$$

where $n_a$ is the index of refraction, which is an intrinsic property for a given material. For most common types of glass and transparent plastics this index is in the range of 1.5-1.6. As the angle of incidence increases, the angle of refraction eventually becomes so great that it reaches 90° and light is reflected back into the refractive material and no light passes through. So the sine of the angle of refraction becomes sin 90°=1. The angle of incidence is then known as the critical angle $\varphi_c$ determined by the formula $$\sin\varphi_c = \frac{1}{n_a}$$

Any light striking the solid-to-air interface of the prism with a greater angle than the critical angle will be reflected back into the prism and not pass downwardly into the air at that interface. For materials with refractive indexes in the range 1.5-1.6 this angle would be in the range 38.7°-41.8°. The light reflected from the adjacent strings of a standard guitar strike an angle greater than this limit and thus are reflected and eliminated from the light contacting the photosensor. The light from the object string above, however, would be well within the critical angle limit and all of its reflected light would pass through the lens and on to the photosensor.

The sensors may generate/output a small amplitude signal which is then converted to a larger amplitude signal by an amplifier and passed on to a circuit element such as a comparator, for example a zero-crossing detector (ZCD). The ZCD then converts this wave into a digital square wave that thus has a frequency equal to the pitch of the vibrating string. Each string of the instrument has a dedicated sensor, amplifier and comparator (e.g., zero-crossing device, ZCD), and each produces an individual and independent square wave signal. The digital square waves produced by these circuits, one from each instrument string, are then connected to separate, discrete inputs of a microcontroller chip where their individual pitches are evaluated. The pitches are determined by measuring the time for one complete cycle (period) of the square wave, or the time between a low-to-high transition of the square wave and its next low-to-high transition. This can, for example, be measured very accurately by counting pulses of the microprocessor's clock that occur during this period. The microprocessor clock has a very high and precise frequency, such as on the order of tens of megahertz, so the resulting period measurement is extremely accurate. The microcontroller chip can be configured so that each of the inputs generates its own interrupt routine in the microcontroller program. These interrupts cause the microcontroller to immediately execute a special subroutine in its program where a timer/counter for each string can be read and reset. The action of this reading takes, for example, less than a microsecond and program execution is then immediately available for any other interrupts. In this way, the pitches of all the instrument strings can be measured simultaneously with the same microcontroller.

These period measurement values are then sent to a wireless data transmitter chip located on the same circuit board, using a wireless data protocol such as Bluetooth, Wi-Fi or the like. Many microcontroller chips include integral wireless data transmitters onboard which obviates the need for a separate chip. Thus, the wireless functionality may be by way of a separate chip or be integral within the microcontroller. The wireless data transmitter then transmits the string pitch values via electromagnetic radio waves from an integral antenna to a distant wireless data receiver/transceiver, which could be a smartphone, a mobile tablet/laptop computer, a wearable device, or any other device with a wireless data receiver/transceiver or access to Wi-Fi. The wireless transceiver can also receive information or commands from a remote unit for use, such as in turning the ultraviolet LEDs on and off, etc. The communication protocol for most wireless systems also allows for multiple devices to communicate, so that a musician could, for example, use both his smartphone and a wearable device simultaneously, if desired. An application program in the receiving device then compares the pitch values to their correct musical pitches stored in its memory and calculates the pitch errors. This error is then translated into a graphical form via a display. The display can be the screen of an existing smartphone, smartwatch, smart glasses, computer, or a dedicated, wearable receiver-display unit using a graphic screen such as a liquid crystal display (LCD), organic light-emitting diode (OLED), or any other form of electronic graphic display. In the case of a self-tuning instrument, the error information can be received and used in automatically tuning the instrument, which could be performed simultaneously for all strings.

A preferred embodiment of the display device would be a wearable electronic display that receives the wireless pitch values via an electronic wireless transceiver and antenna and graphically displays them on an LCD, LED, OLED, TFT or similar type of display and attaches to the musician in a location where the musician can easily see the tuning information yet leave their hands free to tune the instrument, which generally requires the use of both hands (one to turn the tuning pegs and the other to strum the strings). One such location is on the musician's arm. In this embodiment a securing band is attached around the musician's wrist, forearm, upper arm, knee, hand or other location of convenient visibility to the musician. This band can be an elastic material, such as a sweat band, or can be fastened with hook-and-loop fastener (such as Velcro), a buckle, tied in a knot/bow or any other common method for securing a band. To this band is permanently attached a small piece of ferromagnetic metal, such as a steel washer. To the receiver/display unit is permanently attached a small, powerful permanent magnet. When the band is worn on the body, the transceiver/display unit may then be attached magnetically in any convenient orientation that is most easily read by the musician. The magnet then firmly holds the transceiver/display in its optimal position while the musician plays music and is immediately available for use in tuning the instrument at any time. An added benefit of the permanent magnet is that the musician can also wear the arm band under a long-sleeved shirt and the magnetic attraction will still affix the transceiver/display through the sleeve fabric. Alternately, if a band is undesirable, the transceiver/display unit can be attached directly to the musician's skin via spirit gum or double-adhesive tape such as the type used to attach a toupee or wig. The transceiver/display unit may also be attached to any other convenient surface, such as the musician's amplifier, a microphone stand, on a small easel or tripod, under the bill of a hat, etc. The transceiver/display can be activated by touching the screen, in the case of a touchscreen, pressing a switch/button, using a smartphone via wireless communication, or using a hand gesture detected with an ordinary gesture sensor on the display unit.

An additional embodiment of the wearable transceiver/display device entails attaching the transceiver/display device to a pair of glasses (e.g., eyeglasses or sunglasses) worn by the musician. This serves as a low-cost and convenient alternative to using the general-purpose smart glasses on the market, which are currently very expensive and have low adoption. Since the main visual information required to tune the instrument includes the bar graphs and the letter names of the notes being tuned, this simple information can be easily depicted on a long, narrow display. The display can be an OLED, TFT, or any other display method that offers a relatively bright, high-contrast image. The face of this display is mounted to the inner side of an eyeglass temple, directed inward toward the musician's head and its image is reflected near the inner side of the spectacle lens and toward the wearer's eye. If the reflector were flat and at a right angle to the surface of the display, it would appear before the wearer and to the side, but would be too close to the eye for most people to focus clearly. To compensate for this, the present invention uses a thin, transparent, spherically concave reflector. The concave shape converges the reflected light from the display, similar to the refractive effect of a convex lens and compensates for the close proximity, much like reading glasses. This reflector can be constructed from inexpensive clear plastic film, vacuum-formed, blow-molded, or injection molded to the proper radius of curvature. The reflector can be attached as an integral extension of the temple transceiver/display unit or can be a separate piece, attached to the inner surface of the eyeglasses via an adhesive backing. The display image, having a relatively high brightness and contrast, partially reflects from the shiny plastic surface of the reflector and can be seen in the wearer's field of vision, yet the transparent reflector also allows light from in front of the wearer to pass through normally. Since the reflector material is of a uniform thickness, there is no distortion of objects beyond it due to refraction and because it is very thin there is negligible double-imaging, due to reflection from outer and inner surfaces of the reflector material. In this way, the concave shape of the reflector allows it to focus the partially-reflected image of the display, but still allows light to pass through from beyond the reflector without hindering the wearer's perception of his surroundings. Of course, the image is only visible when the display is switched on, during the tuning procedure, and is not present at other times, being switched back off manually or automatically when tuning is complete. The reflector can be constructed from any clear, rigid material, but preferably from an inexpensive material such as polyethylene terephthalate (PETE) plastic, like that used in clear disposable plastic cups, so that it can be easily and economically replaced when it becomes lost, scratched, worn or damaged, and can also be offered in different prescription strengths, much like reading glasses, by offering an assortment of different radii of curvature of the concave shape, altering its focal length. Since the reflected image of the display appears at an oblique angle to the viewer, rather than directly before the viewer, the image appears compressed left-to-right. To compensate for this, the letters and graphs of the display image are represented in an elongated fashion, left to right, so that they appear wide and squat when viewed head-on, but appear to be of normal proportion when viewed at an oblique angle, similar to painted roadway messages to be viewed from within a vehicle. The temple of a pair of eyeglasses is particularly well-suited for this application since it allows a long, narrow area to be displayed. The temple transceiver/display unit includes an integral microcontroller and a wireless transceiver circuit that receives pitch data from the ultraviolet sensor unit on the guitar and can send commands, communicating via radio waves. Since it would be awkward to use buttons or a touchscreen on such a tiny unit, the circuit includes a gesture sensor on the outer-facing side of the circuit board (directed to the side, away from the user's head), such as an Avago APDS-9960, which uses four infrared photodiodes to detect gestures and motions in various directions and configurations (wherein other gesture sensor models are capable of being used). With the proper software libraries provided by the manufacturer, it is easy for the microcontroller to distinguish between up, down, right and left gestures near the sensor as well as more complex motions. There are myriad ways that this can be used as an input to the temple transceiver/display unit to generate and manipulate screens and functions. For example, a forward wave of the musician's hand near his ear could signal the unit to turn on and send a wireless signal to the ultraviolet string sensor unit to start measuring and sending data. A backward wave could trigger the display to show a menu of various tuning schemes. These tuning schemes could be perused by an upward or downward motion of the hand/fingers to scroll up and down through the list of stored tuning schemes. These gestures are mere examples of how gesture control could be implemented and do not limit and/or preclude other gestures from being used.

The apparatus of the present application is operated by strumming all of the strings of the instrument together and allowing them to sustain (e.g., ring out). Alternately, the strings can also be plucked one at a time, resulting in only the appropriate string graph being displayed, to isolate a string for easier interpretation by the musician. The tuning process is initiated either by an input (touchscreen, keypad, switch, etc.) to the wireless receiving/transceiving device, or at the sensor device on the instrument via an input, which may be a touch switch, pushbutton, slide switch, or an optical or capacitive device that senses a gesture by the musician. Since the transceiver/display unit receives pitch information from each string, the musician can also communicate with it by playing specific musical notes to send various commands which are interpreted and executed by the transceiver/display unit.

The device then automatically calculates pitch errors as previously explained and transmits them via radio waves, continuously in real time, as the strings vibrate. The receiver interprets these errors and graphically displays them for all the strings simultaneously. A bar graph or other graphical representation for each string shows analogously the amount and direction (sharp or flat) of the strings' errors. The graphs for strings that are already in-tune are shown using the same color, shape, intensity and/or representation on the display. The graphs for strings that are out-of-tune are shown in a contrasting color, shape, intensity and/or representation. In this way, the musician can immediately spot and tune only the strings that currently need tuning, which allows for quick, periodic "checking" of the instrument to see if it even needs tuning at all. Furthermore, the graphs can be arranged on the display in a similar configuration to how the tuning pegs of the instrument are arranged on its head. For example, instrument heads with three pegs on one side and three on the other would use a program that shows two columns of three graphs each on the display, just as the pegs appear to the musician on the instrument. Instrument heads with all six pegs on one side would use a graphic display that shows a single column of six graphs. Additionally, the graphic can include a representation or photograph depicting the head of the instrument for further clarity. Thus, the musician can simply look at the display and instantly know which pegs to turn and in which direction to turn them. The instrument's configuration is selectable in the settings of the application program, depending on which type of instrument is being tuned. In addition to standard tuning, the apparatus of the present application can be configured to allow for the musician to select different types of tunings such as, "drop D" tuning, slide-guitar tuning, historic temperaments, etc. Such selection of tuning type decides which group of stored "correct" pitches are used as standards of comparison (e.g., for finding/displaying error information) during the tuning process.

Most present tuning devices that use a graphical representation of the instrument's pitch do so in the form of a segmented bar graph in either linear or circular form where each degree of tuning error is represented by aligned "bars" in the graph. Bars increase or decrease in number to indicate how far out-of-tune a string is. This type of graph can become difficult to read when nearing the in-tune state, since the difference between in-tune and one bar out-of-tune is the thickness of a single pixel or LED bar light on the display. It is also difficult to tell if a bar that is two pixels thick is a bar out-of-tune "sharp", or too high in pitch, or a bar out-of-tune "flat", or too low in pitch. The present invention uses a high-resolution display that allows graphs, diagrams or photos of any shape or size to be produced. Rather than graph bars that are parallel with, and identical to, the "in-tune" bar, the present invention displays a shrinking/expanding solid box that is lateral to the central, in-tune bar. As the string becomes closer to being in-tune, the box shrinks in width, eventually down to a single vertical line, then disappears when the string is in tune, leaving only the central, horizontal, in-tune line. This shrinking box appears above the centerline when the string is out-of-tune "sharp" and below the line for notes that are out-of-tune "flat" making it obvious which direction the musician needs to turn the tuning peg to tune the string. The goal for the musician is to be left with just the horizontal, in-tune line. If the string is off by even a slight amount, it is obvious whether it is sharp or flat by the direction of the lateral graph/line. When a string is out-of-tune so far that the box expands to fill the available width, the box blinks to indicate that the string is out of range, blinking above the horizontal line for "out of range sharp" and below the line for "out of range flat". This is particularly important when switching tuning schemes, since the new scheme will involve some different notes, outside the range of where some of the strings are presently tuned. If the signal from a string is lost, either because the string amplitude has decayed away (or because of a malfunction) the center, "in-tune" line disappears entirely. This is an indication to the musician that the string(s) need to be strummed again. All of these graph features add to the speed, accuracy and convenience of the tuning procedure and are an improvement over the existing art. Of course, the graphs could also be rotated ninety degrees, where the in-tune line is vertical and the lateral boxes extend to the right or left, rather than top and bottom.

Additional embodiments of the present invention are as follows.

One embodiment includes a tuning device for tuning a stringed musical instrument including at least one string that is configured to vibrate, the tuning device comprising: a housing configured to be mounted to a body of the stringed musical instrument, the housing including a cavity; and a printed circuit board stored in the cavity, the printed circuit board including a controller, a light emitter, and a light sensor, wherein the light emitter is configured to emit light of a certain frequency in a direction of a surface of a vibrating string of the stringed musical instrument, a portion of the emitted light is reflected from the surface of the vibrating string in a direction toward the light sensor, the light sensor is configured to sense the reflected light and generate a first output representative of the reflected light, and the controller receives and processes the first output to determine a pitch of the vibrating string. The light emitter can comprise an ultraviolet light-emitting diode, and the light sensor can comprise an ultraviolet light photodiode or ultraviolet light phototransistor. The printed circuit board can further include an amplifier and a comparator, wherein the amplifier is configured to amplify the first output and generate a second output serving as an input for the comparator, the comparator is configured to convert the second output to a third output serving as an input to the controller, and the controller processes the third output to generate a fourth output. The printed circuit board can further include a wireless transmitter. The controller can be configured to transmit the fourth output to the wireless transmitter, and the wireless transmitter is configured to wirelessly transmit data representative of the fourth output to a remote device that is configured to process the data with a processor of the remote device to generate a graphical representation of the data. The remote device can include a display configured to display the graphical representation to a user of the stringed musical instrument, such that the graphical representation serves to assist the user in tuning the stringed musical instrument. The printed circuit board can further include a battery. The printed circuit board can further include a power port configured to receive electrical power from an external power source. The battery can be a rechargeable battery configured to recharged by the received electrical power. The external power source can comprise a power adapter.

Another embodiment includes a method of tuning a stringed musical instrument comprising at least one string configured to vibrate, the stringed musical instrument including a housing mounted to a body of the stringed musical instrument, the housing including a cavity having a printed circuit board stored therein, the printed circuit board including a controller, a light emitter, and a light sensor, the method comprising: emitting, via the light emitter, light of a certain frequency in a direction of a surface of a vibrating string of the stringed musical instrument, a portion of the emitted light being reflected from the surface of the vibrating string in a direction toward the light sensor; sensing, via the light sensor, the reflected light; generating, via the light sensor, a first output representative of the reflected light; receiving, via the controller, the first output; and processing, via the controller, the first output to determine a pitch of the vibrating string.

Another embodiment includes a computer program product for a tuning device for tuning a stringed musical instrument comprising at least one string configured to vibrate and a housing configured to be mounted to a body of the stringed musical instrument, the housing including a cavity and having a printed circuit board stored in the cavity, the printed circuit board including a controller, a light emitter, and a light sensor, the computer program product comprising: a plurality of instructions resident on a non-transitory computer-readable recording medium, wherein the instructions are executable by a processor to cause the processor to control: emitting, via the light emitter, of light of a certain frequency in a direction of a surface of a vibrating string of the stringed musical instrument, a portion of the emitted light being reflected from the surface of the vibrating string in a direction toward the light sensor; sensing, via the light sensor, the reflected light; generating, via the light sensor, a first output representative of the reflected light; receiving, via the controller, the first output; and processing, via the controller, the first output to determine a pitch of the vibrating string.

Another embodiment includes a tuning device for tuning a stringed musical instrument comprising a plurality of strings configured to vibrate, the tuning device comprising: a housing configured to be mounted to a body of the stringed musical instrument, the housing including a cavity and a plurality of slots; and a printed circuit board stored in the cavity, the printed circuit board including a controller, a plurality of light emitters, and a plurality of light sensors, wherein respective ones of the plurality of light emitters and light sensors are arranged as a plurality of emitter-sensor pairs comprising one light emitter and one light sensor per pair, and each emitter-sensor pair is positioned to protrude into a corresponding slot from amongst the plurality of slots of the housing, respectively, with each slot of the plurality of slots being positioned in a location underneath a respective string of the plurality of strings of the stringed musical instrument, the plurality of strings being configured to individually vibrate, and wherein each light emitter of the emitter-sensor pairs is configured to emit light of a certain frequency in a direction of a surface of a corresponding vibrating string of the stringed musical instrument, a portion of the emitted light from each light emitter is reflected from the surface of the corresponding vibrating string in a direction toward the corresponding light sensor, each light sensor is configured to sense the corresponding reflected light and generate a respective output representative of the corresponding reflected light for each vibrating string, and the controller receives and processes the outputs to independently and simultaneously determine a pitch of each vibrating string.

Another embodiment includes a method of tuning a stringed musical instrument comprising a plurality of strings configured to vibrate, the stringed musical instrument further including a housing mounted to a body of the stringed musical instrument, the housing including a cavity and a plurality of slots, and a printed circuit board stored in the cavity, the printed circuit board including a controller, a plurality of light emitters, and a plurality of light sensors, wherein respective ones of the plurality of light emitters and light sensors are arranged as a plurality of emitter-sensor pairs comprising one light emitter and one light sensor per pair, and each emitter-sensor pair is positioned to protrude into a corresponding slot from amongst the plurality of slots of the housing, respectively, with each slot of the plurality of slots being positioned in a location underneath a respective string of the plurality of strings of the stringed musical instrument, the plurality of strings being configured to individually vibrate, the method comprising: emitting, via each light emitter of the emitter-sensor pairs, light of a certain frequency in a direction of a surface of a corresponding vibrating string of the stringed musical instrument, a portion of the emitted light from each light emitter is reflected from the surface of the corresponding vibrating string in a direction toward the corresponding light sensor; sensing, via each light sensor, the corresponding reflected light; generating, via each light sensor, a respective output representative of the corresponding reflected light for each vibrating string; receiving, via the controller, the outputs; and processing, via the controller, the outputs to independently and simultaneously determine a pitch of each vibrating string. The printed circuit board can further include a wireless transmitter, and the method can further comprise:

transmitting the processed outputs to the wireless transmitter; wirelessly transmitting, via the wireless transmitter, data representative of the processed outputs to a remote device that is configured to process the data with a processor of the remote device to generate a graphical representation of the data. The method can further comprise displaying, via a display of the remote device, the graphical representation to a user of the stringed musical instrument, such that the graphical representation serves to assist the user in tuning the stringed musical instrument. The graphical representation can include a visualization that dynamically indicates the tuning position of each string of the stringed musical instrument. The graphical representation can be displayed on the display of the remote device via an application program present on the remote device.

Another embodiment include a computer program product for a tuning device for tuning a stringed musical instrument comprising a plurality of strings configured to vibrate, the stringed musical instrument further including a housing mounted to a body of the stringed musical instrument, the housing including a cavity and a plurality of slots, and a printed circuit board stored in the cavity, the printed circuit board including a controller, a plurality of light emitters, and a plurality of light sensors, wherein respective ones of the plurality of light emitters and light sensors are arranged as a plurality of emitter-sensor pairs comprising one light emitter and one light sensor per pair, and each emitter-sensor pair is positioned to protrude into a corresponding slot from amongst the plurality of slots of the housing, respectively, with each slot of the plurality of slots being positioned in a location underneath a respective string of the plurality of strings of the stringed musical instrument, the plurality of strings being configured to individually vibrate, the computer program product comprising a plurality of instructions resident on a non-transitory computer-readable recording medium, wherein the instructions are executable by a processor to cause the processor to control: emitting, via each light emitter of the emitter-sensor pairs, light of a certain frequency in a direction of a surface of a corresponding vibrating string of the stringed musical instrument, a portion of the emitted light from each light emitter is reflected from the surface of the corresponding vibrating string in a direction toward the corresponding light sensor; sensing, via each light sensor, the corresponding reflected light; generating, via each light sensor, a respective output representative of the corresponding reflected light for each vibrating string; receiving, via the controller, the outputs; and processing, via the controller, the outputs to independently and simultaneously determine a pitch of each vibrating string.

Another embodiment includes a tuning device for tuning a stringed musical instrument including at least one string that is configured to vibrate, the tuning device comprising: a housing configured to be mounted to a body of the stringed musical instrument; and a printed circuit board stored in the housing, the printed circuit board including a controller, a light emitter, and a light sensing assembly, wherein the light emitter is configured to emit light of a certain frequency in a direction of a surface of a vibrating string of the stringed musical instrument, a portion of the emitted light is reflected from the surface of the vibrating string in a direction toward the light sensing assembly, the light sensing assembly is configured to sense the reflected light and generate a first output representative of the reflected light, and the controller receives and processes the first output to determine a pitch of the vibrating string. The light sensing assembly can include a light sensor and a lens is mounted atop the light sensor, the light emitter is an ultraviolet light-emitting diode, and the light sensor is an ultraviolet light photodiode or ultraviolet light phototransistor. The lens can be configured to focus light to a sensing portion of the light sensor. The printed circuit board can further include a wireless transmitter. The controller can be configured to transmit the first output to the wireless transmitter, and the wireless transmitter is configured to wirelessly transmit data representative of the first output to a remote device that is configured to process the data with a processor of the remote device to generate a graphical representation of the data. The remote device can include a display configured to display the graphical representation to a user of the stringed musical instrument, such that the graphical representation serves to assist the user in tuning the stringed musical instrument. The printed circuit board and the remote device can each include a battery.

Another embodiment includes a tuning kit for tuning a stringed musical instrument including at least one string that is configured to vibrate, the tuning kit comprising: a tuner module configured to be mounted to a body of the stringed musical instrument, the tuner module including a first processing circuit, a light processing assembly, and first wireless communication electronics, wherein the light processing assembly is configured to receive light representing a vibration characteristic of a vibrating string of the stringed musical instrument; and a receiving display remote from the tuner module and including a second processing circuit, an interface, and second wireless communication electronics, wherein the first and second wireless communication electronics are configured to wirelessly communicate with one another, a first output of the light processing assembly, which is representative of the vibration characteristic, is received and processed by the first processing circuit, the processed first output is wirelessly transmitted, via the first wireless communication electronics, to the second wireless communication electronics, and processed by the second processing circuit to generate dynamic tuning information of the vibrating string, and a visualization of the generated dynamic tuning information is displayed on the interface. The light processing assembly can include a light emitter and a light sensor, the light emitter is configured to emit light of a certain frequency in a direction of a surface of the vibrating string of the stringed musical instrument, a portion of the emitted light is reflected from the surface of the vibrating string in a direction toward the light sensor, the light sensor is configured to sense the reflected light and generate the first output of the light processing assembly, and the first processor circuit receives and processes the first output of the light processing assembly to determine a pitch of the vibrating string, the dynamic tuning information comprising the determined pitch, and the visualization graphically displaying the determined pitch on the interface. The vibrating string can comprise a plurality of vibrating strings, the light processing assembly comprises a plurality of light emitters and light sensors, each respective light emitter of the plurality of light emitters being proximate to a respective vibrating string of the plurality of vibrating strings such that there is a one-to-one correspondence between each light emitter and each vibrating string, each respective light emitter being adjacent a respective light sensor of the plurality of light sensors such that there is a one-to-one correspondence between each light emitter and each light sensor, the first output of the light processing assembly comprising a plurality of outputs, each of the plurality of outputs being representative of a respective vibration characteristic of each vibrating string, each light emitter being configured to emit light of a certain frequency in a direction of a surface of the proximate vibrating string, a portion of each emitted light is reflected from the surface of each proximate vibrating string in a direction toward the proximate light sensor, each respective light sensor being configured to sense the respective reflected light and generate a respective output of the plurality of outputs, and the first processor circuit receives and processes the respective outputs to determine a pitch of each vibrating string, the dynamic tuning information comprising the determined pitches, and the visualization graphically displaying the determined pitches simultaneously on the interface. The light processing assembly can further include a lens, and the lens can be mounted on a top surface of the light sensor. The interface can comprise a display screen, the second processing circuit executes a program to display the visualization on the display screen, and the visualization comprises activation of pixels of the display screen to produce a graphical representation of the generated dynamic tuning information. The graphical representation can include a center portion, a first portion above or to the left of the center portion, and a second portion below or to the right of the center portion. The dynamic tuning information can include a pitch level determined by a second processing circuit by the activation of pixels comprises activation of pixels in (i) a pixel region defining the center portion, (ii) a pixel region defining the first portion, and (iii) a pixel region defining the second portion, where activation of pixels of the center portion pixel region indicates a first pitch, activation of pixels of the first portion pixel region pixel indicates a second pitch, and activation of pixels of the second portion pixel region pixel indicates a third pitch, each of the first, second and third pitch being different from one another. An amount of pixels activated in the activation of the pixels can be proportional to a detected level of pitch within a defined pitch range. The receiving display can comprise a wearable electronics device. The wearable electronics device can include a securing mechanism. The securing mechanism can be a band that is configured to removably secure the wearable electronics device to a body part of a user of the tuning kit. The securing mechanism can be a clip that is configured to allow for removably securing the wearable electronics device to a pair of eyeglasses worn by a user of the tuning kit. The band can comprise a first magnetic material, the wearable electronics device can comprise a second magnetic material, and the first and second magnetic materials can be configured to attract to one another to allow for removably securing the wearable electronics device to the securing band. The wearable electronics device can further comprise a reflector, the interface can comprise a display screen of the wearable electronics device, and the reflector can be configured to (i) receive light representative of a primary image displayed on the display screen, and (ii) provide for formation of a secondary image in a viewing plane that extends beyond a frame of the eyeglasses, such that the secondary image is viewable to a user of the tuning kit that is wearing the eyeglasses. The secondary image can be a reflected representation of the primary image. The reflector can comprise a transparent material and has a concave spherical shape.

Another embodiment includes a method of tuning a stringed musical instrument comprising at least one string configured to vibrate, the stringed musical instrument including a housing mounted to a body of the stringed musical instrument, the housing including a printed circuit board stored therein, the printed circuit board including a controller, a light emitter, and a light sensing assembly, the method comprising: emitting, via the light emitter, light of a certain frequency in a direction of a surface of a vibrating string of the stringed musical instrument, a portion of the emitted light being reflected from the surface of the vibrating string in a direction toward the light sensor; sensing, via the light sensing assembly, the reflected light; generating, via the light sensing assembly, a first output representative of the reflected light; receiving, via the controller, the first output; and processing, via the controller, the first output to determine a pitch of the vibrating string. The light sensing assembly can includes a lens and a photosensor.

Another embodiment includes a method of tuning a stringed musical instrument including at least one string configured to vibrate, the method comprising: installing a tuner module on a body of the stringed musical instrument, the tuner module including a first processing circuit, a light emitter, a light processing assembly, and first wireless communication electronics, wherein the light emitter is configured to emit light of a certain frequency in a direction of the at least one string, and the light processing assembly is configured to receive reflected light from a surface of the at least one string, the reflected light representing a pitch characteristic of the at least one string when the at least one string is vibrating; placing a receiving display on an object at a remote location from the tuner module, the receiving display including a second processing circuit, an interface, and second wireless communication electronics, wherein the first and second wireless communication electronics are configured to wirelessly communicate with one another, and the remote location is a location at which the first and second wireless communication electronics are within range of one another so as to be able to wirelessly communicate with one another; placing both the tuner module and the receiving display in a power-on operative state; selecting a tuning mode of the receiving display, the tuning mode including at least one pre-programmed pitch; manipulating the at least one string to cause the at least one string to vibrate; emitting, via the light emitter, the light of a certain frequency in the direction of the vibrating at least one string; sensing, via the light processing assembly, the reflected light representing the pitch characteristic; outputting an electronic signal from the light processing assembly, the electronic signal being representative of the pitch characteristic; receiving, via the first processing circuit, the outputted electronic signal; processing, via the first processing circuit, the received electronic signal; transmitting, via the first wireless communication electronics, the processed electronic signal to the second wireless communication electronics to serve as an input signal for the receiving display; receiving, via the second wireless communication electronics, the transmitted input signal; processing, via the second processing circuit, the received input signal; determining, from the processed input signal, a pitch of the pitch characteristic; dynamically calculating a pitch difference between the determined pitch and the at least one pre-programmed pitch; generating a dynamic visualization viewable on the interface, the dynamic visualization representing the dynamically calculated pitch difference; and tuning the at least one string to the at-least one pre-programmed pitch based on the dynamic visualization. The at least one string can comprise a plurality of strings, the light emitter can comprise a plurality of light emitters, each respective light emitter of the plurality of light emitters can be arranged adjacent each respective string of the plurality of strings such that there is a one-to-one correspondence between each light emitter and each string; the light processing assembly can include a plurality of light sensors, each respective light sensor can be adjacent each respective light emitter such that there is a one-to-one correspondence between each light sensor and each light emitter, and each respective light sensor can be configured to receive reflected light from a surface of the corresponding respective string, the reflected light from each surface of the strings representing a pitch characteristic of each respective string when each respective string is vibrating; the at least one pre-programmed pitch can comprise a pre-programmed pitch for each of the plurality of strings, the electronic signal can comprise a plurality of electronic signals, the input signal can comprise a plurality of input signals, and the pitch difference can comprise a plurality of pitch differences. The method can further comprise manipulating the plurality of strings to cause each of the plurality of strings to vibrate; emitting, via each respective light emitter, light of a certain frequency in a direction of the corresponding respective vibrating string; sensing, via each corresponding respective light sensor, reflected light representing the pitch characteristic of each corresponding respective vibrating string; outputting the plurality of electronic signals from the light processing assembly, the electronic signals being representative of the pitch characteristic of each corresponding respective vibrating string, each respective pitch characteristic corresponding to a respective pre-programmed pitch such that there is a one-to-one correspondence between each pitch characteristic and each pre-programmed pitch; receiving, via the first processing circuit, the outputted electronic signals; processing, via the first processing circuit, the received electronic signals; transmitting, via the first wireless communication electronics, the processed electronic signals to the second wireless communication electronics to serve as the input signals for the receiving display; receiving, via the second wireless communication electronics, the transmitted input signals; processing, via the second processing circuit, the received input signals; determining, from the processed input signal, a pitch of each pitch characteristic of the corresponding respective strings; dynamically calculating the pitch differences between each determined pitch and the corresponding pre-programmed pitch; generating a dynamic visualization viewable on the interface, the dynamic visualization representing the dynamically calculated pitch differences; and tuning each of the plurality of strings to the corresponding respective pre-programmed pitch based on the dynamic visualization. The object at the remote location can comprise (i) a viewing surface upon which the receiving display is located, or (ii) a body part of a user of the receiving display, the receiving display being attached to the body part. The receiving display can be configured to mount to eyeglasses of the user, such that when the user is wearing the eyeglasses, an image displayed on the interface is viewable by the user.

Another embodiment includes a method of tuning a stringed musical instrument including at least one string configured to vibrate, the stringed musical instrument comprising a tuner module and a receiving display, the tuner module being mounted on a portion of a body of the stringed musical instrument, the receiving display being mounted at a location different from that of the tuner module, the tuner module including a first processing circuit, a light emitter, a light processing assembly, and first wireless communication electronics, wherein the light emitter is configured to emit light of a certain frequency in a direction of the at least one string, and the light processing assembly is configured to receive reflected light from a surface of the at least one string, the reflected light representing a pitch characteristic of the at least one string when the at least one string is vibrating, the tuner module including a paired receiving display, the receiving display including a second processing circuit, an interface, and second wireless communication electronics, wherein the first and second wireless communication electronics are configured to wirelessly communicate with one another, and a distance between the location of the receiving display and the tuner module is such that the first and second wireless communication electronics are within range of one another and able to wirelessly communicate with one another, the method comprising: placing both the tuner module and the receiving display in a power-on operative state; selecting a tuning mode of the receiving display, the tuning mode including at least one pre-programmed pitch; manipulating the at least one string to cause the at least one string to vibrate; emitting, via the light emitter, the light of a certain frequency in the direction of the vibrating at least one string; sensing, via the light processing assembly, the reflected light representing the pitch characteristic; outputting an electronic signal from the light processing assembly, the electronic signal being representative of the pitch characteristic; receiving, via the first processing circuit, the outputted electronic signal; processing, via the first processing circuit, the received electronic signal; transmitting, via the first wireless communication electronics, the processed electronic signal to the second wireless communication electronics to serve as an input signal for the receiving display; receiving, via the second wireless communication electronics, the transmitted input signal; processing, via the second processing circuit, the received input signal; determining, from the processed input signal, a pitch of the pitch characteristic; dynamically calculating a pitch difference between the determined pitch and the at least one pre-programmed pitch; generating a dynamic visualization viewable on the interface, the dynamic visualization representing the dynamically calculated pitch difference; and tuning the at least one string to the at-least one pre-programmed pitch based on the dynamic visualization.

Another embodiment includes a computer program product for a tuning kit for tuning a stringed musical instrument, the stringed musical instrument including at least one string configured to vibrate, the tuning kit comprising a tuner module and a receiving display, the tuner module being mounted on a portion of a body of the stringed musical instrument, the receiving display being mounted at a location different from that of the tuner module, the tuner module including a first processing circuit, a light emitter, a light processing assembly, and first wireless communication electronics, wherein the light emitter is configured to emit light of a certain frequency in a direction of the at least one string, and the light processing assembly is configured to receive reflected light from a surface of the at least one string, the reflected light representing a pitch characteristic of the at least one string when the at least one string is vibrating, the tuner module including a paired receiving display, the receiving display including a second processing circuit, an interface, and second wireless communication electronics, wherein the first and second wireless communication electronics are configured to wirelessly communicate with one another, and a distance between the location of the receiving display and the tuner module is such that the first and second wireless communication electronics are within range of one another and able to wirelessly communicate with one another, the computer program product comprising a plurality of tuner module instructions resident on a non-transitory computer-readable recording medium of the tuner module, wherein the tuner module instructions are executable by a processor of the tuner module to cause the tuner module processor to control: emitting, via the light emitter, the light of a certain frequency in the direction of the at least one string when the at least one string is vibrating as a result of being manipulated by a user of the stringed musical instrument and the tuning kit; sensing, via the light processing assembly, the reflected light representing the pitch characteristic; outputting an electronic signal from the light processing assembly, the electronic signal being representative of the pitch characteristic; receiving, via the first processing circuit, the outputted electronic signal; processing, via the first processing circuit, the received electronic signal; and transmitting, via the first wireless communication electronics, the processed electronic signal to the second wireless communication electronics to serve as an input signal for the receiving display; and a plurality of receiving display instructions resident on a non-transitory computer-readable recording medium of the receiving display, wherein the receiving display instructions are executable by a processor of the receiving display to cause the receiving display processor to control receiving, via the second wireless communication electronics, the transmitted input signal; processing, via the second processing circuit, the received input signal; determining, from the processed input signal, a pitch of the pitch characteristic; dynamically calculating a pitch difference between the determined pitch and the at least one pre-programmed pitch; and generating a dynamic visualization viewable on the interface, the dynamic visualization representing the dynamically calculated pitch difference, wherein the user of the stringed musical instrument and tuning kit is able to tune the at least one string to the at-least one pre-programmed pitch based on the dynamic visualization.

A light processing assembly according to any of the above embodiments can comprise a lens and a sensor, and the lens can be mounted on a top surface of the sensor. The lens can be a prismatic lens, and the sensor can be a photodiode configured to detect ultraviolet light.

The receiving display according to the above embodiment(s) can comprise an unmanned aerial vehicle. The unmanned aerial vehicle can be a drone.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings. The description and specific examples in this summary are intended for purposes of illustration only and are not intended to limit the scope of the present disclosure.

BRIEF DESCRIPTION OF THE DRAWINGS

The accompanying drawings, which are incorporated in and form a part of the specification, illustrate the embodiments of the present disclosure and together with the description, serve to explain the principles of the disclosure.

FIG. 3 illustrates an electronic schematic of the tuning apparatus according to FIG. 2, showing how the signals from the sensors are conditioned, fed to the microcontroller and how data is then transmitted wirelessly to a remote receiver.

FIG. 6A illustrates one embodiment for the overall graphical display for the tuning apparatus of the present application, indicating a relationship between the graphics with respect to the physical configuration of the musical instrument tuning pegs on each side of the head of the musical instrument.

FIG. 6B illustrates another embodiment for the overall graphical display for the tuning apparatus of the present application, indicating a relationship between the graphics with respect to the physical configuration of the musical instrument tuning pegs on one side of the head of the musical instrument.

FIG. 8 illustrates a flowchart showing communication and interoperability between the tuning apparatus of the musical instrument and the application of the remote device.

FIG. 9 illustrates a series of graph representations that are possible for each tuning graph on receiver/display units, illustrating a lateral-widening scheme.

FIG. 10A illustrates another embodiment for the overall graphical display for the tuning apparatus of the present application, indicating a relationship between the graphics with respect to the physical configuration of the musical instrument tuning pegs on each side of the head of the musical instrument.

FIG. 10B illustrates another embodiment for the overall graphical display for the tuning apparatus of the present application, indicating a relationship between the graphics with respect to the physical configuration of the musical instrument tuning pegs on one side of the head of the musical instrument.

Figure 1A:
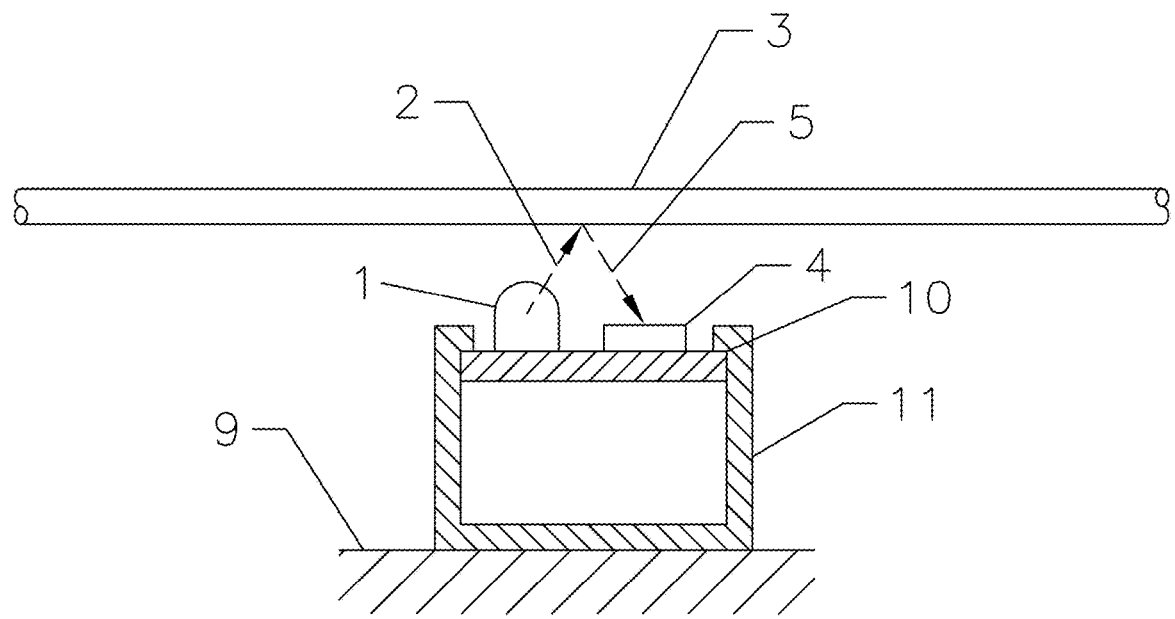
FIG. 1A illustrates a cross section view of one embodiment of a tuning apparatus of the present application, showing how light is reflected off the strings of the instrument and sensed.

Reference characters in the written specification indicate corresponding items shown throughout the drawing figures.

DETAILED DESCRIPTION

Referring to FIG. 1A, an embodiment of a tuning apparatus of the present application is shown, including a light emitter (e.g., an ultraviolet (UV) light emitting diode (LED)) 1 that emits light 2 that shines upon an instrument's string 3. A light sensor (e.g., a UV light sensor) 4 is also present. Some of the UV light 2 reflects away from the surface of the string 3 and back toward the light sensor 4 along path 5. The instrument comprises a body 9. The LED 1 and the UV light sensor 4 are soldered to a printed circuit board (PCB) 10, which is enclosed by a housing 11, which is (e.g., permanently) affixed to the body 9 of the stringed musical instrument (e.g., guitar). The housing 11 may also be referred to as a case or a casing. The tuning apparatus may be referred to as a tuner/tuning module and/or a tuner/tuning device, and may comprise part of an overall tuner/tuning kit intended to be used with the stringed musical instrument.

Figure 1B:
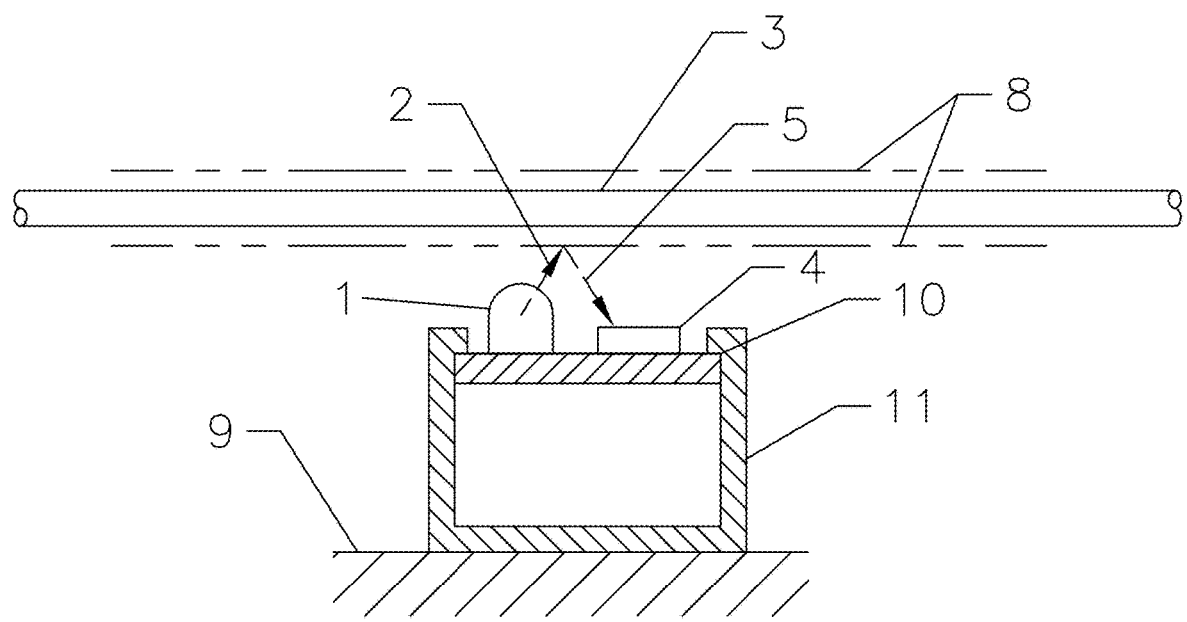
FIG. 1B illustrates a cross section view of the tuning apparatus according to FIG. 1A, showing how a vibrating string affects the reflected light from the string as it strikes the light sensor.

Referring now to FIG. 1B, when the string 3 is set into motion, it vibrates (e.g., oscillates) in relation to the LED 1 and the UV light sensor 4 moving to the extent of its oscillating motion or vibration 8. The LED 1 and UV light sensor 4 do not vibrate and remain stationary, being affixed to the PCB 10, housing 11 and instrument body 9. The oscillating motion (e.g., oscillating motion 8) causes the direction of the beam of reflected UV light 5 to deflect, causing a variation in the UV light intensity sensed by the UV light sensor 4, which causes a corresponding variation in the output voltage of the UV light sensor 4.

Figure 2:
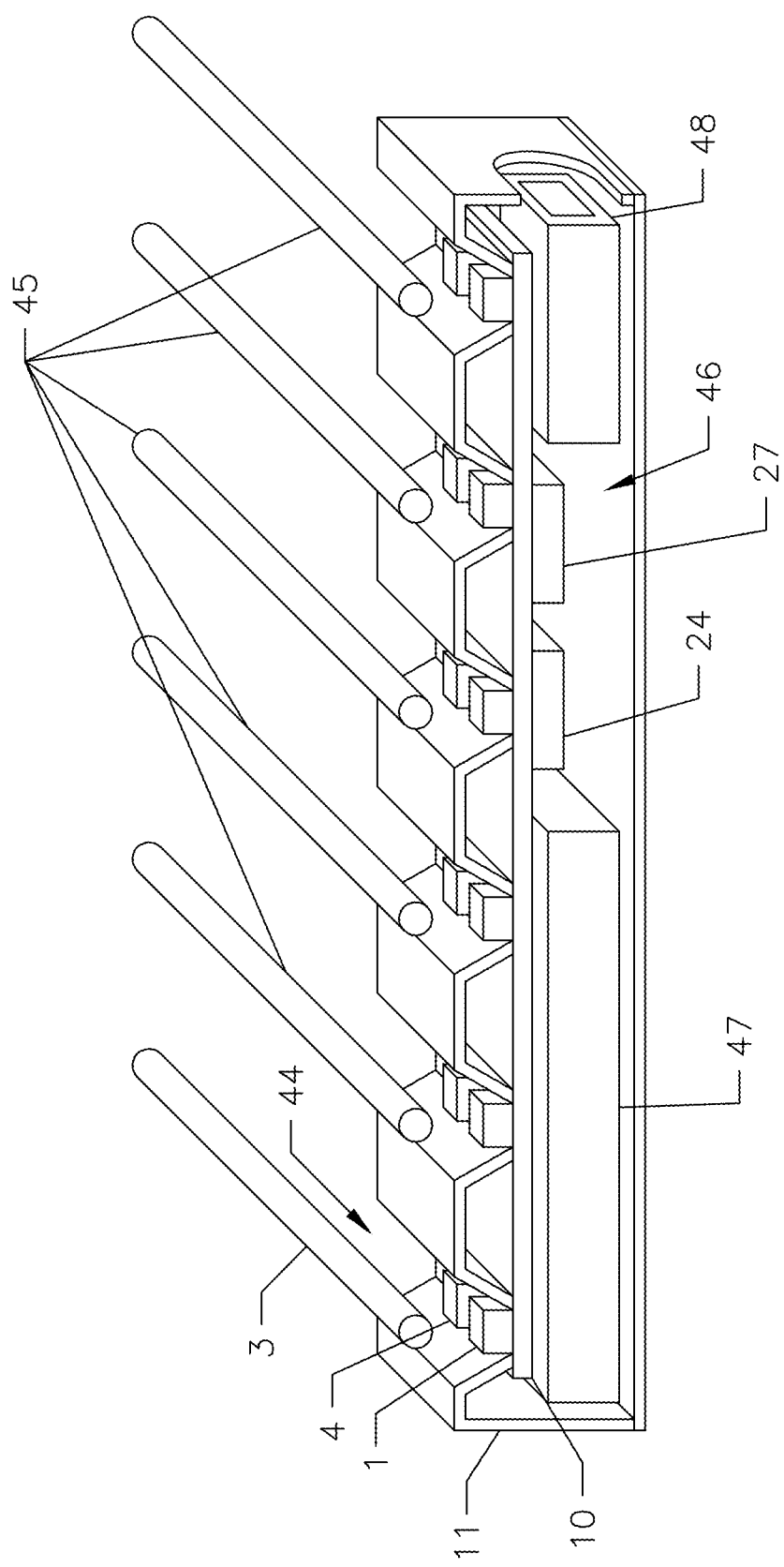
FIG. 2 illustrates an elevated view of another embodiment of the tuning apparatus, showing how the tuning apparatus is configured to avoid sensing stray reflections.

FIG. 2 shows a preferred embodiment of the tuning apparatus of the present application in which an LED and a light sensor are paired and located under each instrument string. Like reference numbers to those discussed above in FIGS. 1A and 1B are used in FIG. 2. As shown in FIG. 2, the LED 1 and light sensor 4 pair are located under each instrument string 3, one pair for each string. These LED 1 and light sensors 4 are soldered to a PCB 10 which is contained within an (e.g., oblong) housing 11. The housing 11 is shaped so that each LED/light sensor pair is located in a slot 44 that runs parallel with its associated string 3. This slot 44 is made deep enough that the light sensor 4 can only sense reflections of UV light from its corresponding string 3 above and is blocked from stray reflections from adjacent strings 45. The housing 11 includes a cavity 46. On the underside of the PCB 10 is soldered a microcontroller chip 24 and a wireless transmitter chip 27. This microcontroller 24 performs a variety of tasks, including but not limited to controlling the light output of the light emitters 1 and processing the data that results from the light sensed by the light sensors 4. Also in the cavity 46 inside the housing 11 and beneath the PCB 10 is a (e.g., rechargeable) battery 47. This battery is charged via an input (e.g., power) jack/port 48 for the attachment of an external power adapter or USB cord (not shown).

FIG. 3 shows a circuit schematic of the tuning apparatus shown in FIG. 2. As shown in FIG. 3, the UV light sensor 4 receives reflected UV light (originally provided by LED 1) from the vibrating string 3 and converts it to a periodic waveform 13. This waveform mimics the vibration 8 of the string 3 and has a frequency equal to the frequency or musical pitch of the vibrating string 3. This waveform is typically too small in magnitude (e.g., amplitude) to be useful, and as such is amplified by an electronic amplifier 14 (such as an operational amplifier), producing wave 15, which has a much larger amplitude than periodic waveform 13, yet possesses the same frequency and/or pitch of the smaller periodic waveform 13. This larger wave 15 is then passed on to a circuit element such as a comparator, for example in the form of an electronic zero-crossing detector (ZCD) 16. The ZCD 16 detects where the alternating voltage of wave 15 crosses through zero and switches an output 17 of the ZCD 16 to a logic "high" 19 for a low-to-high transition, or a logic "low" 20 for a high-to-low transition, resulting in a square wave output 18 having a frequency equal to the string's pitch. This square wave output 18 is passed on from the output 17 of the ZCD 16 to an input 23 of a microcontroller chip 24. This same sensing and signal processing is performed by similar separate, independent circuits 25 for each string in the stringed instrument, with each circuit connected to separate and distinct inputs (e.g., input lines) 26 of the microcontroller chip 24. The microcontroller 24 then determines the frequency of each of the (e.g., six) square wave outputs 18 inputted for each string and transmits these numerical values to a wireless transmitter/transceiver chip 27. The wireless transmitter/transceiver chip 27 then arranges these values into a (e.g., serial) electronic communication protocol and transmits them as (e.g., modulated electromagnetic) radio frequency (RF) waves 32 radiated via a first antenna 28. Alternatively, the wireless transmitter/transceiver chip 27 could be integral to the microcontroller chip 24. The modulated RF wave 32 is then received by a second antenna 29 of a radio receiver 30 of a remote wireless device 35 where it is demodulated to extract the numeric data, which is then sent to a processor (e.g., CPU) 31 of the remote wireless device 35. The processor 31 then compares the frequency values to their correct, in-tune values that have been previously stored in a memory 33 of the tuning apparatus and calculates the error for each instrument string. This error is used to determine how far each string is out-of-tune and is shown in a graphical manner on a display 34 of the remote wireless device 35. The remote wireless device 35 may be a smartphone, smartwatch, smart glasses, computer, self-tuning system, or a dedicated wearable receiver-display unit. For example, in the case of smart glasses, the smart glasses may receive wireless data and display tuning information to the musician visually in the form of images that appear before the musician's eyes via the lens of the glasses (e.g., when wearing the glasses). The remote wireless device may be referred to as a receiving/wireless/remote display and/or a wireless/remote receiver and/or wireless receiver device and/or wearable transceiver/device, and may comprise another part of the overall tuner/tuning kit as described above, and is intended to be used in conjunction with the tuner/tuning module/device (e.g., the tuner/tuning module/device and the remote wireless device (aka receiving/wireless/remote display and/or a wireless/remote receiver)) are used together such that the vibrating string(s) information collected from the tuner/tuning module/device can be used by the remote wireless device (aka receiving/wireless/remote display and/or a wireless/remote receiver) to assist a user in tuning the instrument).

Figure 4:
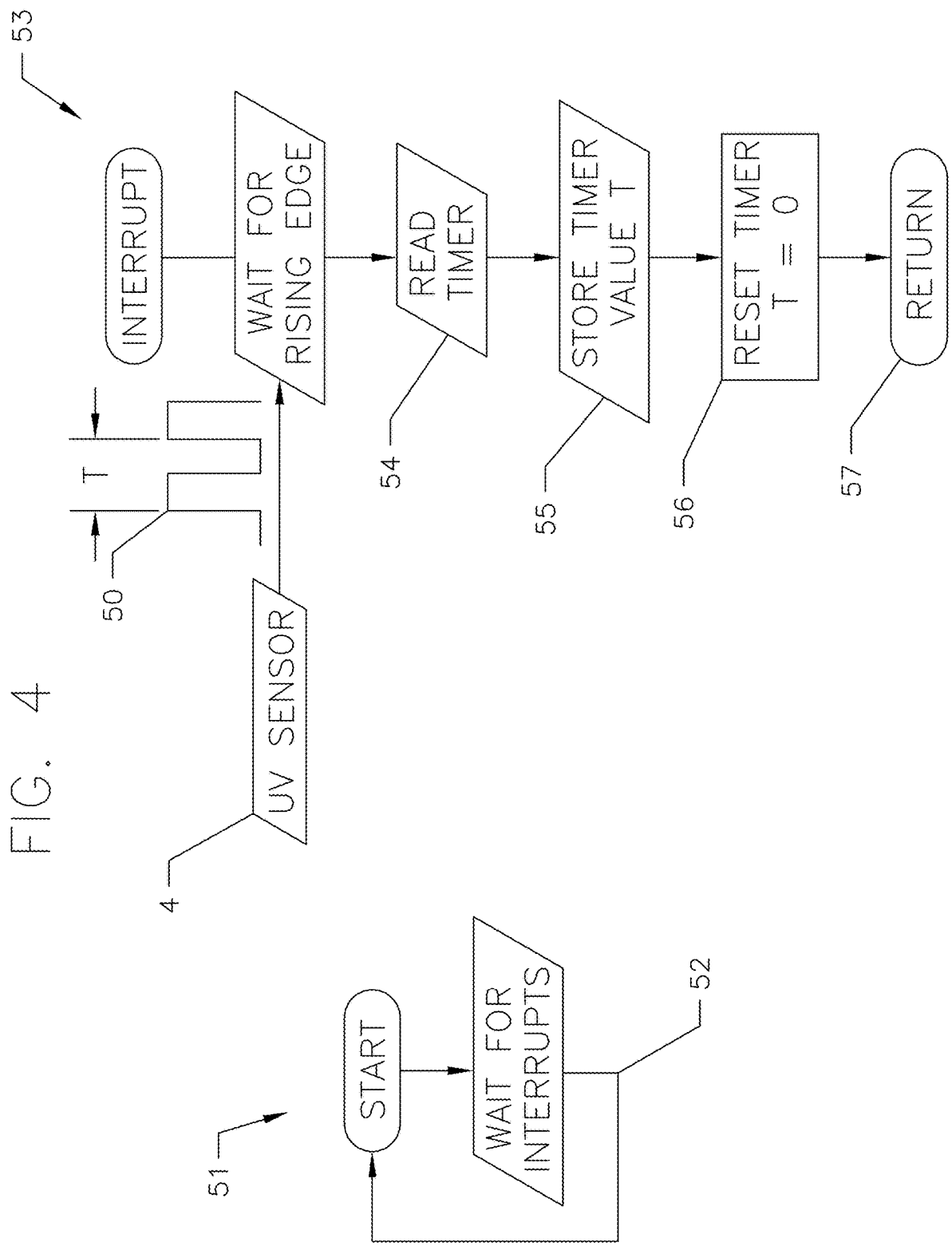
FIG. 4 illustrates a flowchart showing how square input waves from a zero-crossing detector of the tuning apparatus according to FIG. 2 are measured using program interrupts to determine a string's period.

Referring to FIG. 4, a flowchart for the steps (e.g., software/program) for performing the above-noted techniques is shown. A main program 51 of the microcontroller 24 operates in a continuous loop 52 waiting for interrupts to happen. Input square waves 50 (e.g., such as square waves output 18 in FIG. 3) from the sensors 4 to the microcontroller are set up in the software as an external interrupt that triggers the program to execute an interrupt service routine (ISR) 53 any time an input wave 50 is rising (e.g., has a low-to-high transition). Each of the input sensors 4 is connected to its own dedicated input line 26 and has its own dedicated ISR routine in the program so that each string 3 can be evaluated independently. Within this ISR a dedicated timer in the microcontroller 24 is read at step 54 and its value (e.g., "T") is stored at step 55 in the memory 33 of the microcontroller 24. Then the timer value is reset at step 56 to zero (although the timer continues to run, timing again from zero, and does not stop) and program execution is returned at step 57 to the main program loop 51. This subroutine 53 is executed by the microcontroller 24 extremely quickly (e.g., within a fraction of a microsecond) and does not affect the accuracy of the time measurement T. In this way, every vibration of the string 3 triggers an interrupt at every rising edge and the time that is stored at step 55 in memory is always equal to the period of the string vibration T, or the time of one complete cycle of vibration. The frequency of a wave is simply the reciprocal of this period according to the formula f=1/T, where f is the wave frequency in hertz and T is the period in seconds. With this simple formula the frequency can easily be calculated from this period T. It is these values T that are transmitted, one for each string in the instrument, via radio waves 32 to the wireless device 35 for evaluation.

Figure 5:
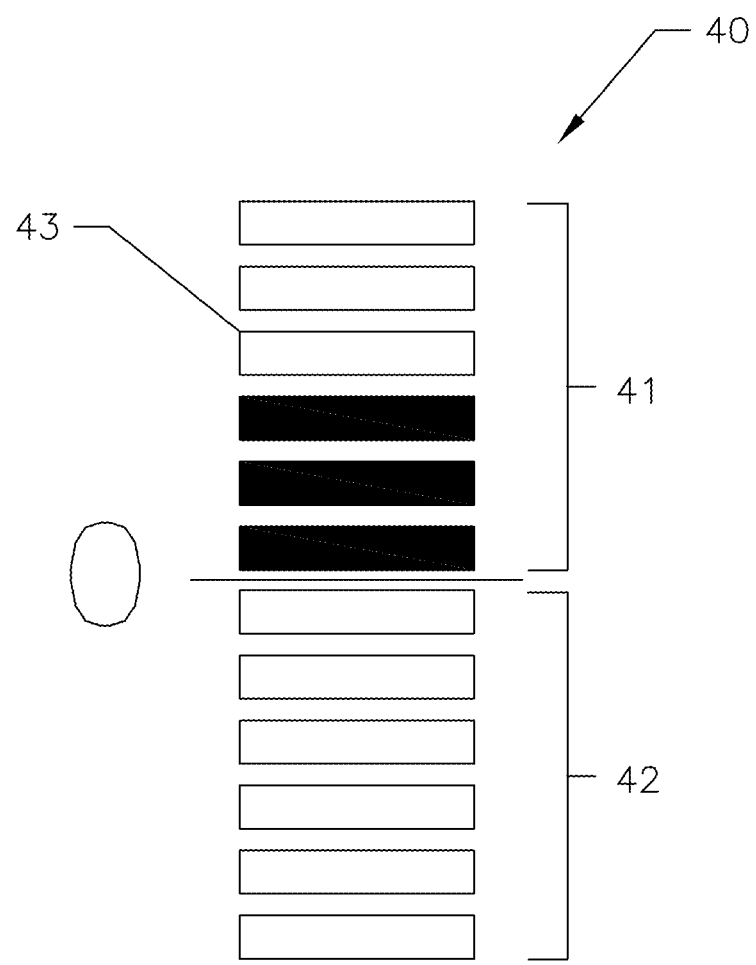
FIG. 5 illustrates a representation of one embodiment of graphics of a graphical display configuration for the tuning apparatus according to the present application, showing individual graphs that display how out-of-tune a string is.

FIG. 5 illustrates one example of how a graphic portion of the display 34 of the wireless receiver device 35 may be configured with respect to portraying tuning of a single string 3. The error from the instrument string has been translated into a segmented graph 40, wherein a string with a frequency that is too high (e.g., sharp) is shown proportionately on the upper half 41 of the graph. The greater the degree of sharpness, the more of segments 43 are illuminated, from the bottom up, and the higher the graph reads. Conversely, if a string's frequency is too low (e.g., flat), the lower half 42 of the graph 40 extends downward proportionately in the same fashion. If the string is already in tune (neither sharp nor flat, see "0" point in FIG. 5) the graph would indicate so by not illuminating any segments 43 and/or changing the color, shape, intensity and/or representation of the graph to contrast, for example, with other graphs that still need to be tuned (e.g., in a multi-string embodiment, discussed below). Thus, the graph 40 dynamically represents the tuning position (e.g., sharp, flat, in-tune) of the string. Of course visualizations other than the graph shown in FIG. 5 can be used, so long as the visualization conveys the necessary tuning position information to the user. For example, an alternative visualization is described below with respect to FIGS. 9, 10A and 10B.

FIGS. 6A and 6B illustrate examples of how the graphical configuration shown on the display 34 of the wireless device 35 may be configured when all of the string errors of the instrument are shown together. Individual graphs 40 (as depicted alone in FIG. 5, for example), one for each string, are arranged on the display in a manner that corresponds to how the corresponding tuning pegs on the head of the instrument appear to the musician. FIG. 6A shows one embodiment of a graphical arrangement on the display 34 for a six-string guitar that has three tuning pegs on one side of the (e.g., head) of the instrument and three tuning pegs on an opposite side. FIG. 6B shows another embodiment of a graphical arrangement on the display 34 for a different six-string guitar that has all six tuning pegs on one side of the (e.g., head) of the instrument. In addition to the plurality of graphs 40, a depiction (e.g., stylized silhouette) 49 of the current type of instrument head is shown for reference. The individual graphs are located about the silhouette in the same locations that the tuning pegs of the instrument are configured around the instrument's head, to aid the musician in quickly determining which tuning peg(s) to turn and in which direction to bring each string into tune.

Figure 7:
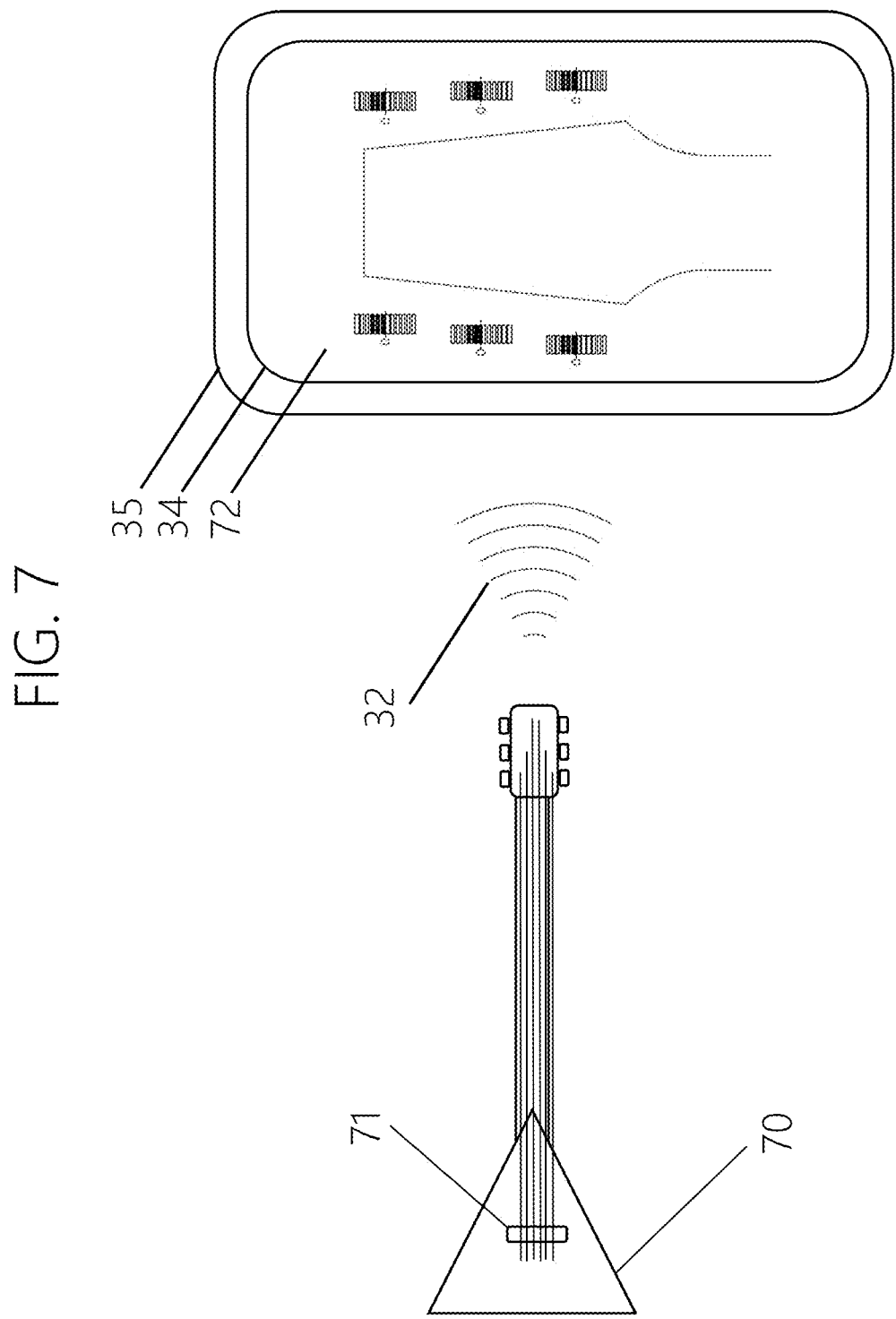
FIG. 7 illustrates a musical instrument including the tuning apparatus according to FIG. 2 wirelessly transmitting tuning data to a remote device, which displays tuning information via an application of the remote device.

FIG. 7 illustrates an example of how a musical instrument including the tuning device of the present application would operate in conjunction with the remote device of the present application. A musical instrument 70 (e.g., a guitar) is outfitted with a tuning device 71, where tuning device 71 can be the embodiment of the device shown in FIG. 2. As a user tunes the instrument (e.g., as a user plucks and/or strums strings of a guitar), frequency information of each vibrating string is generated, received, and processed by the tuning device 71, in the manner described above. The tuning device 71 then wirelessly transmits, via transmission 32, the tuning data that was processed from the strumming of the strings, in the manner described above. The remote device 35 receives the wireless transmission 32, and a corresponding application 72 of the remote device 35 displays a dynamic graphical arrangement (such as the graphical arrangement of FIG. 6A) of the tuning information on the display 34 of the remote device 35. The remote device 35 may be the musician's smartphone, tablet, or other like device, such as a (e.g., dedicated) wireless remote display unit. For example, in the case of a smartphone, the smartphone may include sufficient interconnectivity (e.g., wireless communication) hardware (e.g., Wi-Fi, Bluetooth and/or other wireless protocol chips, formed as (or in association and/or communication with) radio receiver (e.g., 30) as described above, including any necessary and/or corresponding antennas) capable of receiving data transmissions from the tuning device in the manner shown in FIG. 3. The CPU of the smartphone can manage the received data and execute the application according to the received data. The application on the smartphone may be configured to parse the received information from the tuning device in order to achieve display of the illustrative graphical arrangements shown in FIGS. 5, 6A and 6B. In the case of wireless transmission of tuning data to a smart device with a large, full-color screen and/or high-resolution display, the software can perform a myriad of tasks, such as exotic tunings and temperaments, saved tunings, captured tunings and complex, animated, multi-page/screen presentation of the information, not possible with extant (e.g., small screen and/or low resolution) devices that comprise monochromic, segmented or dot-matrix displays.

FIG. 8 illustrates a flowchart of how the techniques shown in FIG. 7 are achieved. Tuning information received by the tuning apparatus (e.g., 71) of the musical instrument (e.g., 70) is (wirelessly) transmitted to the remote device (e.g., 35) so that the tuning information can be displayed via the application (e.g., 72) of the remote device. In the remote device, a software routine 73 runs, in which at step 74, wireless data from tuning device 71 (see FIG. 7) is transmitted as indicated by arrow 80, received by the antenna(s) of the remote device, and stored in the memory of the remote device. After receipt and storage of this wireless data, the pitch errors of the strings are calculated at step 75. As shown at step 78, the calculations at step 75 rely on stored correct pitch data to be input as indicated by arrow 79 into the routine for determination of the pitch errors in the manner described above with respect to the comparisons performed by processor 31. The calculation of the pitch errors is output so that the errors can be turned into a visualization (e.g., graphical arrangement) to be used by the user (e.g., musician) for tuning of the musical instrument. Step 76 shows, for example, that the pitch errors can be visualized as bar graphs that are generated for display, via the application, on the screen of the remote device (e.g., the bars being configured to show sharp/in-tune/flat for each string, as described above and as shown in FIGS. 6A and 6B). While bar graphs are one preferable embodiment of a visualization used to convey the pitch errors to a user to assist in tuning, the visualization of such pitch errors is not limited to bar graphs. Other visualization formats (e.g., dots, lines, (musical) symbols, and the like) are within the scope of the graphical arrangement/representation disclosed herein, so long as such other visualization formats suitably convey tuning information to the user for allowing the user to tune the instrument based on what the visualization is showing. Another such visualization format is represented in FIGS. 9, 10A and 10B, described below. Step 77 represents a return loop, illustrating how the remote device is able to continuously (e.g., dynamically) display up-to-date tuning information as the user tunes the instrument (e.g., strums strings of a guitar). For example, each successive strum of strings of the instrument is received, processed, and transmitted by the tuning apparatus of the instrument, so as to be received, processed and displayed via the remote device for enabling dynamic (e.g., live/instantaneous) tuning of all of the strings of the instrument.

FIG. 9 illustrates another embodiment of how a graphic portion of the display 34 of the wireless receiver device 35 may be configured with respect to portraying tuning of a single string (e.g., 3 as shown in FIGS. 1A and 1B), similar to the graph(s) 40 as shown in FIGS. 5, 6A and 6B. An array of display pixels 150 is shown, with pixels that have been lit depicted as darkened boxes 125 and pixels that have not been lit depicted as open boxes 126. In this embodiment, a perfectly in-tune string would produce a graph 127 with a single horizontal line at the center. This line may or may not be a different color than the rest of the graph, depending on the color capabilities of the display. As a string becomes higher in pitch, the display would first show a vertical line as shown in graph 128 centered from left to right and above the horizontal line. As the pitch of the instrument string becomes higher and higher, the vertical line widens symmetrically, pixel width-by-pixel width, as represented by the vertical line in graph 129, eventually becoming wider as shown by the vertical line in graph 130, and then ultimately filling up the entirety of the top half of the graph as shown by the vertical line in graph 131 (wherein the vertical line in graph 131 represents a completely solid upper graph where each pixel is lit, as shown by all of the boxes in graph 131 being darkened boxes 125). The upper graph is, for example, comprised of all of the boxes located above the horizontal line as shown in graph 127. The visualization of strings with a pitch lower than the in-tune pitch would start with a vertical line 132 below the horizontal line (where vertical line 132 is similar to the vertical line in graph 128 but on the opposite side of the horizontal line). Vertical line 132 becomes wider as the string becomes lower and lower in pitch in the same manner as described above with respect to the widening of the vertical line of the upper graph. Strings with a pitch so high that it is out of range of the graph are represented, for example, by a solid upper graph as in graph 131 that can flash and/or change to a contrasting color or other visualization/configuration to indicate the pitch being out of range. Strings with a pitch so low that is out of range of the lower graph are represented by a solid, flashing and/or contrasting lower graph (where the lower graph comprises the boxes below the horizontal line as shown in graph 127). Strings that are not sensed by the photosensor(s) 4 would be indicated by an entirely blank graph, without even a horizontal bar (e.g., an entirely blank graph is one like the graph 127 but with all of the boxes of the graph being open boxes 126). This graphical configuration could also be rotated ninety degrees so that the in-tune lines are vertical and the bars extend to the right and left to indicate sharp or flat and expand and contract vertically to indicate the degree of error. Of course, visualizations other than the graph shown in FIG. 9 can be used, so long as the visualization conveys the necessary tuning position information to the user. The hardware (e.g., controller) and software of the remote receiving device are configured to control the display of information of the display screen of the remote device, including generation of the visualizations such as by techniques described above in connection with step 76 as shown in FIG. 8.

FIGS. 10A and 10B illustrate examples of how the graphical configuration shown on the display 34 of the wireless device 35 (e.g., see FIG. 7) may be configured when all of the string errors of the instrument are shown together, similar to FIGS. 6A and 6B, but utilizing the visualization styling and techniques of FIG. 9. Individual graphs 150 (similar to graphs 40 as depicted in FIGS. 5, 6A, and 6B), one for each string, are arranged on the display in a manner that corresponds to how the corresponding tuning pegs on the head of the instrument appear to the musician. FIG. 10A shows one embodiment of a graphical arrangement on the display 34 for a six-string guitar that has three tuning pegs on one side of the (e.g., head) of the instrument and three tuning pegs on an opposite side. FIG. 10B shows another embodiment of a graphical arrangement on the display 34 for a different six-string guitar that has all six tuning pegs on one side of the (e.g., head) of the instrument. In addition to the plurality of graphs 150, the current type of instrument head is shown for reference by depictions 49, similar to that shown in FIGS. 6A and 6B. This depiction 49 may be a stylized silhouette that represents the head of the instrument or may be a digital photograph of the actual instrument head that can be captured with the user's smartphone camera or other digital camera and custom-inserted into the display image as a bitmap, jpeg, or the like, via the smartphone application program. The individual graphs are located about the head depiction in the same locations that the tuning pegs of the instrument are configured around the instrument's head, to aid the musician in quickly determining which tuning peg(s) to turn and in which direction, to bring each string into tune. For example, with respect to FIG. 8, step 76 can instead generate the graph style of FIGS. 9, 10A and 10B instead of the bar graph styling as shown in FIGS. 5, 6A, 6B and 7.

Figure 11:
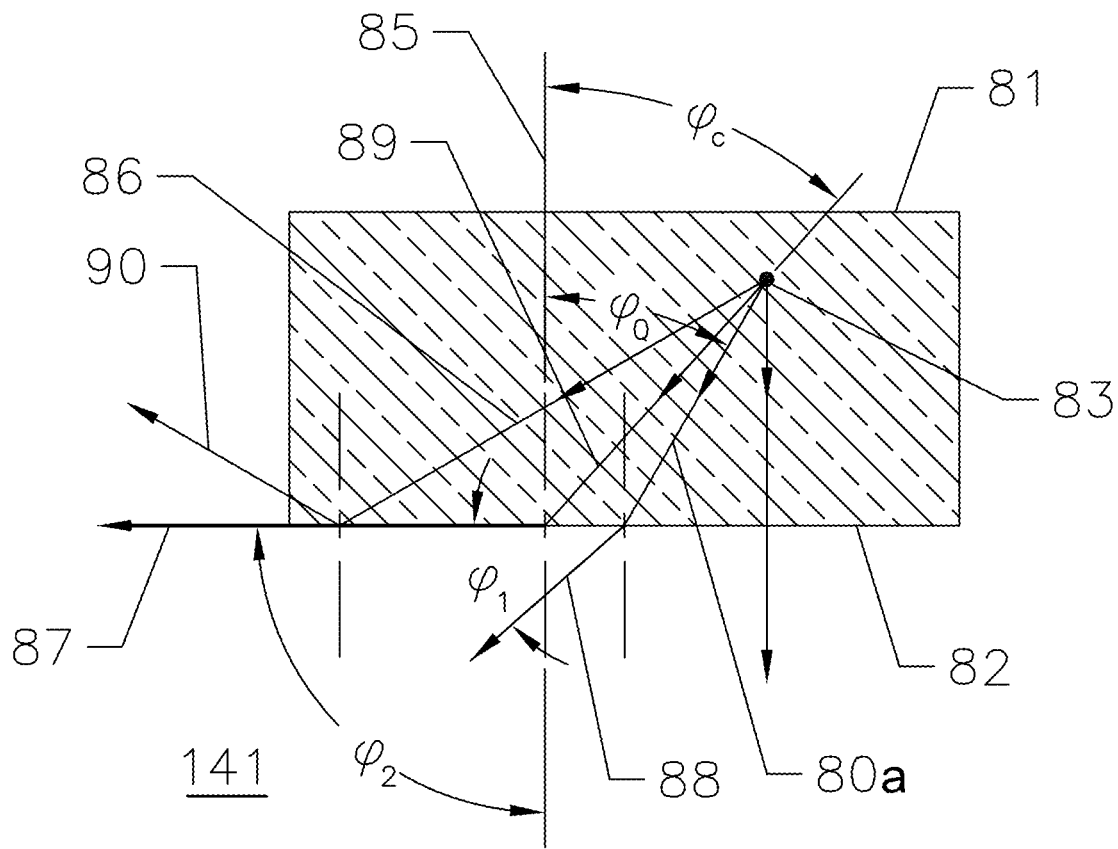
FIG. 11 illustrates how light rays passing from a transparent solid to air are reflected when the angle of incidence exceeds the critical angle.
Figure 12:
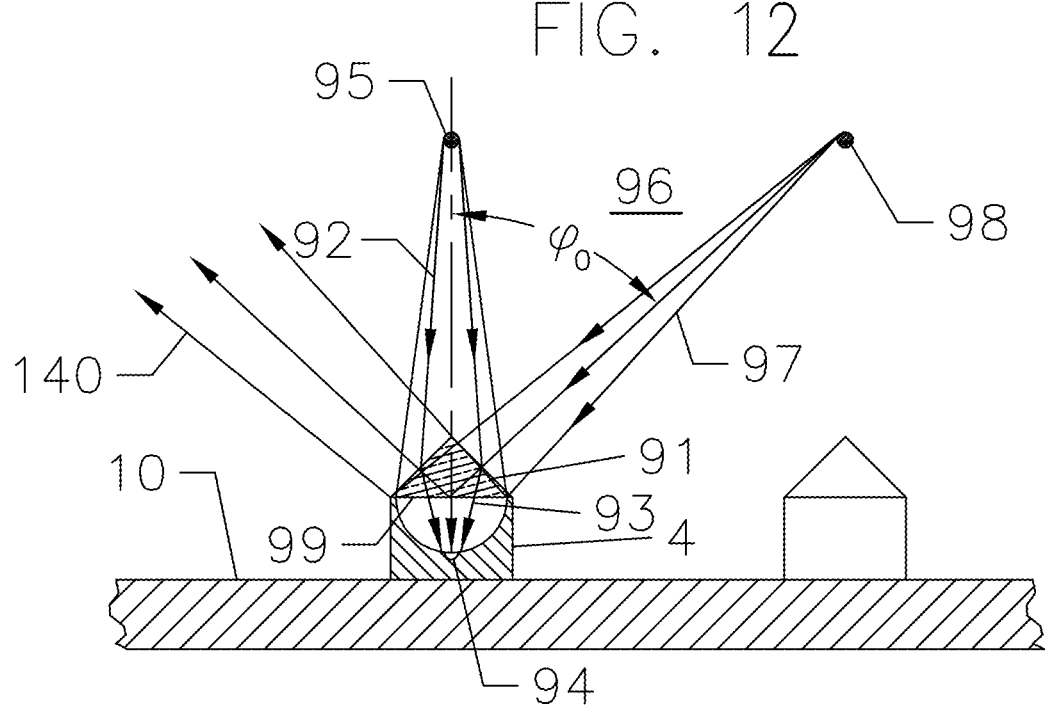
FIG. 12 illustrates how the reflected light from an object string above a sensor is focused onto the sensor by a prismatic lens, while light reflected from an adjacent string is refracted and reflected away from the sensor.

FIGS. 11 and 12 illustrate an alternative embodiment from that shown in FIG. 2, and includes using a lens (e.g., prismatic lens) in conjunction with the photosensor (e.g., 4) for the detection of light signals (e.g., the embodiment of FIGS. 11 and 12 adds the usage of a lens for each sensor 4 of embodiment of FIG. 2). FIG. 11 shows how light rays such as that depicted by the arrow 80a travelling inside a transparent material 81 are refracted as they pass from an interior point 83 and meet the interface 82 between the solid material 81 and the air 141. The transparent material 81 represents a material that is used as the prismatic lens. As discussed above, prismatic lenses are made from a solid, transparent material such as acrylic or polycarbonate plastic, glass, epoxy, or any other optically clear material and shaped in the form of an isosceles triangle, symmetric about the plane passing through the centerline of the object string and the center of the sensor. These lenses serve to (i) converge reflected light from the object string directly overhead by refracting the light inward, intensifying the light contacting the photosensor and increasing its effect (which allows the string to be detected from farther away and with smaller vibrations so that the signal can be accurately measured over a longer decay period), and (ii) reject light reflected from adjacent strings that would interfere with the signal from the object string. Light reflecting from adjacent strings enters the prismatic lens from a more oblique angle than light reflected from the object string directly above. Consequently, though the light is refracted downward toward the sensor as it enters the prism, when it passes on to the bottom inner surface of the prism, nearest the sensor, and attempts to exit, the light is reflected back into the prism and does not pass through to the sensor. This is due to the fact that the light strikes the inner surface of the lens at an angle greater than the so-called critical angle of the refractive material. The angle of refraction $\varphi_a$ of a transparent solid is related to the angle of incidence $\varphi_0$ by the formula $$\sin \varphi_0 = n_a \sin \varphi_a$$

where $n_a$ is the index of refraction, which is an intrinsic property for a given material. For most common types of glass and transparent plastics this index is in the range of 1.5-1.6. As the angle of incidence increases, the angle of refraction eventually becomes so great that it reaches 90° and light is reflected back into the refractive material and no light passes through. So the sine of the angle of refraction becomes sin 90°=1. The angle of incidence is then known as the critical angle $\varphi_c$ determined by the formula $$\sin \varphi_c = \frac{1}{n_a}$$

Any light striking the solid-to-air interface of the prismatic lens (e.g., formed as a prism) with a greater angle than the critical angle will be reflected back into the prism and not pass downwardly into the air at that interface. For materials with refractive indexes in the range 1.5-1.6 this angle would be in the range 38.7°-41.8°. The light reflected from the adjacent strings of a standard guitar strike an angle greater than this limit and thus are reflected and eliminated from the light contacting the photosensor. The light from the object string above, however, would be well within the critical angle limit and all of its reflected light would pass through the lens and on to the photosensor.

Applying this to the embodiment in FIG. 11, the light ray 80a from point 83 strikes an angle $\varphi_0$ following a line 85 that is perpendicular to the interface 82 and passes through the point of contact 86 of the light ray 80a. Due to refraction, the light beam 80a changes direction 88 at the interface 82 striking a different angle $\varphi_1$ with the vertical line 85 according to the formula presented in the summary of the invention. As the angle $\varphi$ increases, as in the case of light ray 89, the refracted angle also increases until, when it reaches the critical angle $\varphi_c$ from the vertical line 85 at which point the refracted angle $\varphi_2$ reaches 90° and the light ray 87 refracts parallel to the interface 82 and does not pass through to the air 141. It can be seen that for increasing angles $\varphi$ beyond this, such as ray 86, a light ray 90 will be reflected back into the material so that any angle of incidence greater than $\varphi_c$ will not make it through the interface 82 and will be reflected away and back into a prism formed of such material 81.

FIG. 12, with reference to FIGS. 1A, 1B, and 2, shows how the principle described above in connection with FIG. 11 is applied to the ultraviolet light (e.g., 2, 5) from the light source (e.g., 1) when it is reflected from a string 95 (aka string 3 in FIGS. 1A, 1B, and 2) and reaches a prismatic lens 91, where prismatic lens 91 comprises a material such as transparent material 81. While a prismatic lens is one preferred embodiment of the lens, this type of lens is not limiting and other lens types may be used so long as they accomplish the necessary focusing of light for the photosensor. When light rays 92 contact the prismatic lens 91 they are refracted inward toward a photosensing portion 94 of overall photosensor 4 (see also FIGS. 1A, 1B, and 2) in the direction of arrows 93 as they pass from the air 96 into a material of higher index of refraction. These rays 93 are further reflected inward as they pass from the prismatic lens 91 back into the air 96. This focuses the ultraviolet light contacting the photosensing portion 94, increasing its intensity and the resulting electronic signal. Conversely, ultraviolet light rays 97 reflecting off an adjacent string 98 enter the prismatic lens 91 at a much greater angle from the vertical, which is greater than the critical angle $\varphi_c$, and are thus reflected away as shown by arrow 140 at an interface 99 and do not penetrate or shine onto the photosensing portion 94. In this way, interference from light reflected from the adjacent string(s) 98 is eliminated by the prism, while enhancing light from the object string.

Figure 13:
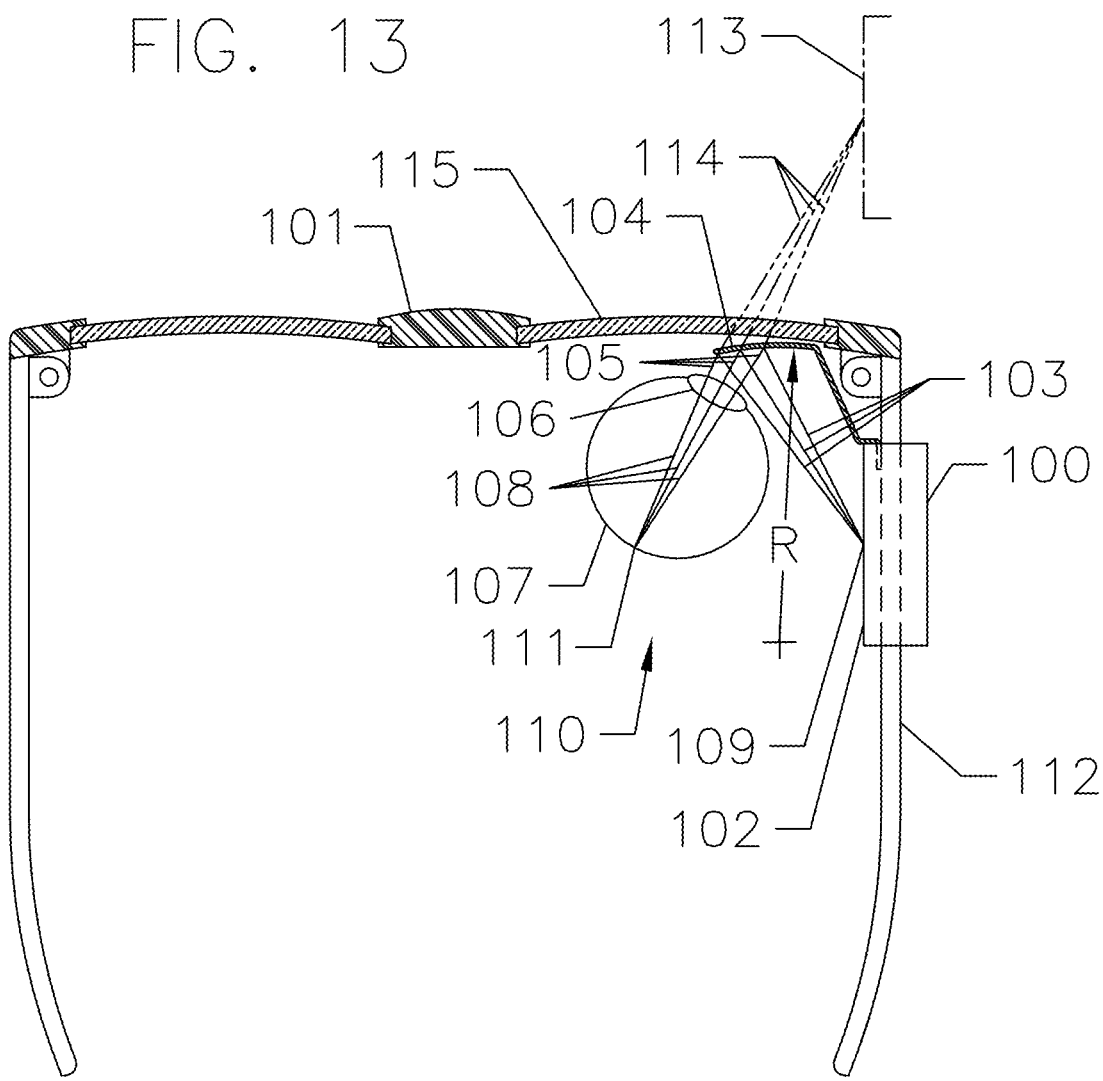
FIG. 13 illustrates a partial cross section showing the positioning of the temple transceiver/display unit and reflector on a pair of eyeglasses and how the display image is reflected and directed into the human eye, focusing it onto the retina.

FIG. 13 shows an alternative embodiment of display 34 and receiver device 35, where FIG. 13 illustrates a temple-type display unit 100 mounted to a pair of eyeglasses 101 on a right temple portion 112 of the eyeglasses. The embodiment in FIG. 13 is configured to communicate/operate with the tuner (e.g., 71, see FIG. 7) installed on the instrument. On the left side display face 102 of the display unit 100 is a lighted display (described below) that displays toward the left. Light rays 103 from a display of the display face 102 shine toward a transparent reflector (e.g., lens) 104 from an arbitrary point 109 from the display face 102 and are partially reflected by the shiny surface toward the (human) eyeball 110 of the wearer. The concave spherical surface of the transparent reflector 104 at radius R converges the light rays 105 as they approach the lens 106 of the human eyeball 110, which further converge the light rays 108 which then focus to a point 111 on the retina 107 of the eyeball 110. This reflection of light from the display unit 100 causes image 113 to appear in space before the wearer as if the light rays 114 emanated from an actual object. The space represents a viewing plane that extends beyond a frame of the eyeglasses 101. Since the reflector 104 is transparent, image 113 is only a partial reflection and real objects beyond the image can be seen clearly through the eyeglass lens 115 and the transparent reflector 104 as normal. The instrument head/graph displays shown in FIGS. 6A, 6B, 10A and 10B are examples of the images shown the display face 102 of display unit 100 that can be seen as image 113, for example.

Figure 14:
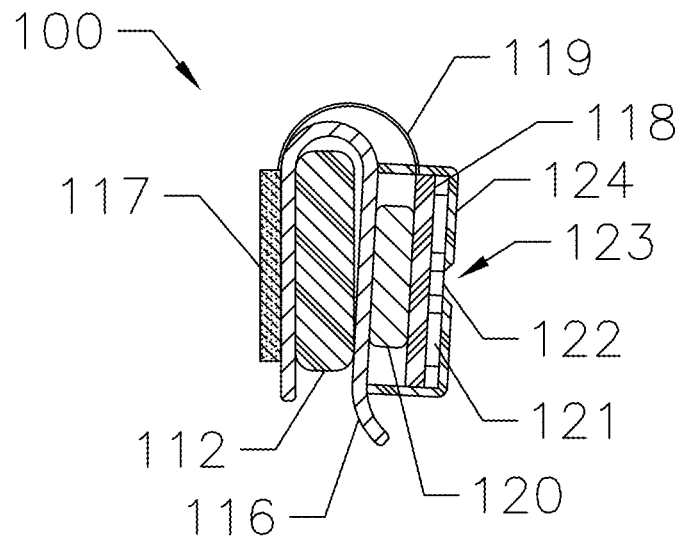
FIG. 14 illustrates a cross section showing the construction of the temple display unit and how it attaches to the temple piece of a pair of eyeglasses.

FIG. 14 shows a cross section view of the temple display unit 100 in its preferred embodiment, mounted to the temple portion 112 with a spring clip 116 that holds the display unit securely in place with a clamping force. The clip 116 can easily be installed onto the eyeglass temple portion 112 by clipping it on downwardly from above. On the inward surface of the clip 116 is mounted an (e.g., OLED) display screen 117. Electronic signals are sent to a display screen 117 via a ribbon, a Flat Flex cable, or individual wires or the like 119, coming from a main control board 118. The display screen 117 is of display face 102. The main control board 118 comprises a microcontroller/wireless radio receiver 121 that receives the tuning signal. While FIG. 14 shows ribbon/cable/wire are being exposed, it may be covered by a housing, such as an extension of housing 124. The display unit 100 and microcontroller/wireless radio receiver 121 thereof can be configured in a manner so as to enable communications and processes as shown in FIGS. 3, 4, 7 and 8 and as described above. For example, with respect to FIG. 3, the microcontroller/wireless radio receiver 121 of FIG. 14 may be an embodiment of the radio receiver 30, CPU 31, and memory 33 (e.g., formed as an integral processing unit or formed separately). The circuit is powered by a primary or secondary (e.g., rechargeable) battery 120. A gesture sensor 122 is also mounted to the circuit board 118 and senses hand gestures through aperture 123. The control board 118 is encased in a protective housing 124.

As described above, in this eyeglasses embodiment, the wearable transceiver/display device entails attaching the transceiver/display device to a pair of glasses (e.g., eyeglasses or sunglasses) worn by the musician. This serves as a low-cost and convenient alternative to using general-purpose smart glasses on the market, which are currently very expensive and have low adoption, thereby representing an improvement over conventional techniques. The visual tuning information required to tune the instrument includes graphs and/or letter names of the notes being tuned. The display 117 can be an OLED, TFT, or any other display type or method that offers a relatively bright, high-contrast image. The face of this display is mounted to the inner side of an eyeglass temple, directed inward toward the musician's head and its image is reflected near the inner side of the spectacle lens and toward the wearer's eye. If the reflector were flat and at a right angle to the surface of the display, it would appear before the wearer and to the side, but would be too close to the eye for most people to focus clearly. To compensate for this, the present invention uses a thin, transparent, spherically-concave reflector (e.g., 104). The concave shape converges the reflected light from the display, similar to the refractive effect of a convex lens and compensates for the close proximity, much like reading glasses. This reflector can be constructed from inexpensive clear plastic film, vacuum-formed, blow-molded, or injection molded to the proper radius of curvature. The reflector can be attached as an integral extension of the temple transceiver/display unit or can be a separate piece, attached to the inner surface of the eyeglasses via an adhesive backing. The display image, having a relatively high brightness and contrast, partially reflects from the shiny plastic surface of the reflector and can be seen in the wearer's field of vision, yet the transparent reflector also allows light from in front of the wearer to pass through normally. Since the reflector material is of a uniform thickness, there is no distortion of objects beyond it due to refraction and because it is very thin there is negligible double-imaging, due to reflection from outer and inner surfaces of the reflector material. In this way, the concave shape of the reflector allows it to focus the partially-reflected image of the display, but still allows light to pass through from beyond the reflector without hindering the wearer's perception of his surroundings. Of course, the image is only visible when the display is switched on, during the tuning procedure, and is not present at other times, being switched back off manually or automatically when tuning is complete. The reflector can be constructed from any clear, rigid material, but preferably from an inexpensive material such as polyethylene terephthalate (PETE) plastic, like that used in clear disposable plastic cups, so that it can be easily and economically replaced when it becomes lost, scratched, worn or damaged, and can also be offered in different prescription strengths, much like reading glasses, by offering an assortment of different radii of curvature of the concave shape, altering its focal length. Since the reflected image of the display appears at an oblique angle to the viewer, rather than directly before the viewer, the image appears compressed left-to-right. To compensate for this, the graphs of the display image are represented in an elongated fashion, left to right, so that they appear wide and squat when viewed head-on, but appear to be of normal proportion when viewed at an oblique angle, similar to painted roadway messages to be viewed from within a vehicle. The temple of a pair of eyeglasses is particularly well-suited for this application since it allows a long, narrow area to be displayed. The temple transceiver/display unit includes an integral microcontroller and a wireless transceiver circuit (e.g., 121) that receives pitch data from the ultraviolet sensor unit on the guitar and can send commands, communicating via radio waves. Since it would be awkward to use buttons or a touchscreen on such a tiny unit, the circuit includes a gesture sensor (e.g., 122) on the outer-facing side of the circuit board (directed to the side, away from the user's head), such as, but not limited to, an Avago APDS-9960, which uses four infrared photodiodes to detect gestures and motions in various directions and configurations. With the proper software libraries provided by the manufacturer, it is easy for the microcontroller to distinguish between up, down, right and left gestures near the sensor as well as more complex motions. There are myriad ways that this can be used as an input to the temple transceiver/display unit to generate and manipulate screens and functions. For example, a forward wave of the musician's hand near his ear could signal the unit to turn on and send a wireless signal to the ultraviolet string sensor unit to start measuring and sending data. A backward wave could trigger the display to show a menu of various tuning schemes. These tuning schemes could be perused by an upward or downward motion of the hand/fingers to scroll up and down through the list of stored tuning schemes. These gestures are mere examples of how gesture control could be implemented and do not limit and/or preclude other gestures from being used. Another possible method of sending control signals to the display/transceiver unit includes playing specific notes on the guitar while in tuning or selection mode. Since the ultraviolet unit sends frequency information to the display/transceiver unit wirelessly for each string, a specific string/frequency combination could be designated so as to be interpreted as a specific command, such as scrolling up or down through different tuning schemes. For example, playing a note "A" (fifth fret) on the "E" string would send a frequency of 440 Hz to the display/transceiver. When the display/transceiver unit receives a frequency of 440 Hz it can interpret this as a command and execute processing according to the command accordingly. Since the ultraviolet lights and sensors are disabled while playing (described below), there is no danger of accidentally triggering commands while the musician is playing music.

Figure 15:
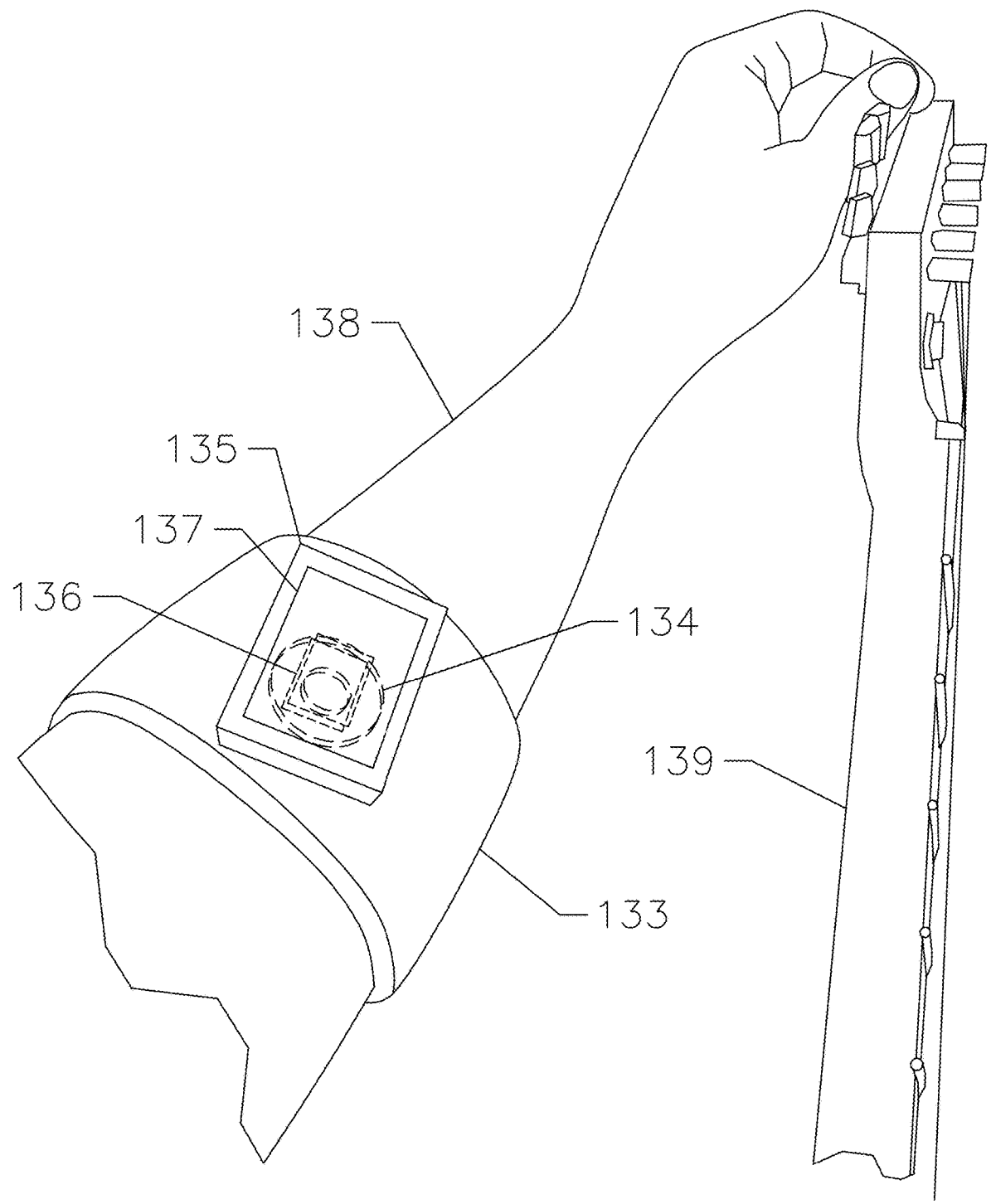
FIG. 15 illustrates a musician's view of how the arm-mounted display unit would look while tuning the guitar and how it attaches magnetically to the arm band.

FIG. 15 depicts another embodiment of a wearable receiver/display unit 135 (e.g., see also 35 in FIGS. 3 and 7). In this configuration, the musician wears an arm band 133 on their arm 138 onto/into which has been attached or sewn a piece of ferromagnetic material 134 like a steel washer. To the back side of the display unit 135 is affixed a permanent magnet 136. During play, the unit 135 is attached to the arm band 133 with the magnet which holds it in the desired viewing position so that a touchscreen display 137 is easily readable while tuning a guitar 139. The orientation of the receiver/display unit 135 can be adjusted as desired by turning it about. Because of the friction caused by the magnetic attraction of the magnet 136, the position of the display with respect to the viewer will remain unchanged during play and will be ready for the next tuning. This embodiment offers all the same features (tuning scheme selection, etc.) as the temple receiver/display unit 100, though selections can be made using an ordinary touch-type screen 137, rather than gesture control. While unit 135 is intended to be used with an arm band, the unit 135 may simply be placed on a remote surface (e.g., not on a body part of the user), so long as the user is able to see the display and use the unit for tuning. For example, the wireless device may simply be placed on the floor or on a cabinet, etc. The unit 135 must be within the required physical range of any wireless communication protocols used, although the option of remote tuning (e.g., via the cloud) is envisioned. For example, if Bluetooth is used, the remote unit (e.g., 135) cannot be at a distance from the tuner module (e.g., 71, mounted on the body of the instrument) that is greater than the maximum distance at which Bluetooth is able to communicate (e.g., 30 feet).

In this arm band embodiment shown in FIG. 15, the screen 137 may be an LCD, LED, OLED, TFT or similar type of display and attaches to the musician in a location (e.g., forearm) where the musician can easily see the tuning information yet leave their hands free to tune the instrument, which generally requires the use of both hands (one to turn the tuning pegs and the other to strum the strings). A securing band (e.g., 133) is attached around the musician's forearm (or upper arm, knee, hand or other location of convenient visibility to the musician). The band can be an elastic material, such as a sweat band, or can be fastened with hook-and-loop fastener (such as Velcro), a buckle, tied in a knot/bow or any other common method for securing a band. To this band is permanently attached a small piece of ferromagnetic metal (e.g., 134), such as a steel washer. To the receiver/display unit is permanently attached a small, powerful permanent magnet (e.g., 136). When the band is worn on the body, the transceiver/display unit may then be attached magnetically in any convenient orientation that is most easily read by the musician. The magnet then firmly holds the transceiver/display in its optimal position while the musician plays music and is immediately available for use in tuning the instrument at any time. An added benefit of the permanent magnet is that the musician can also wear the arm band under a long-sleeved shirt and the magnetic attraction will still affix the transceiver/display through the sleeve fabric. Alternately, if a band is undesirable, the transceiver/display unit can be attached directly to the musician's skin via spirit gum or double-adhesive tape such as the type used to attach a toupee or wig. The transceiver/display unit may also be attached to any other convenient surface, such as the musician's amplifier, a microphone stand, on a small easel or tripod, under the bill of a hat, mounted to an unmanned aerial vehicle (aka UAV, such as a drone in the form of a nano-drone) suspended before the musician, etc. The transceiver/display can be activated by touching the screen, in the case of where the embodiment uses a touchscreen (or pressing a switch/button, using a smartphone via wireless communication, or using a hand gesture detected with an ordinary gesture sensor on the display unit).

Figure 16:
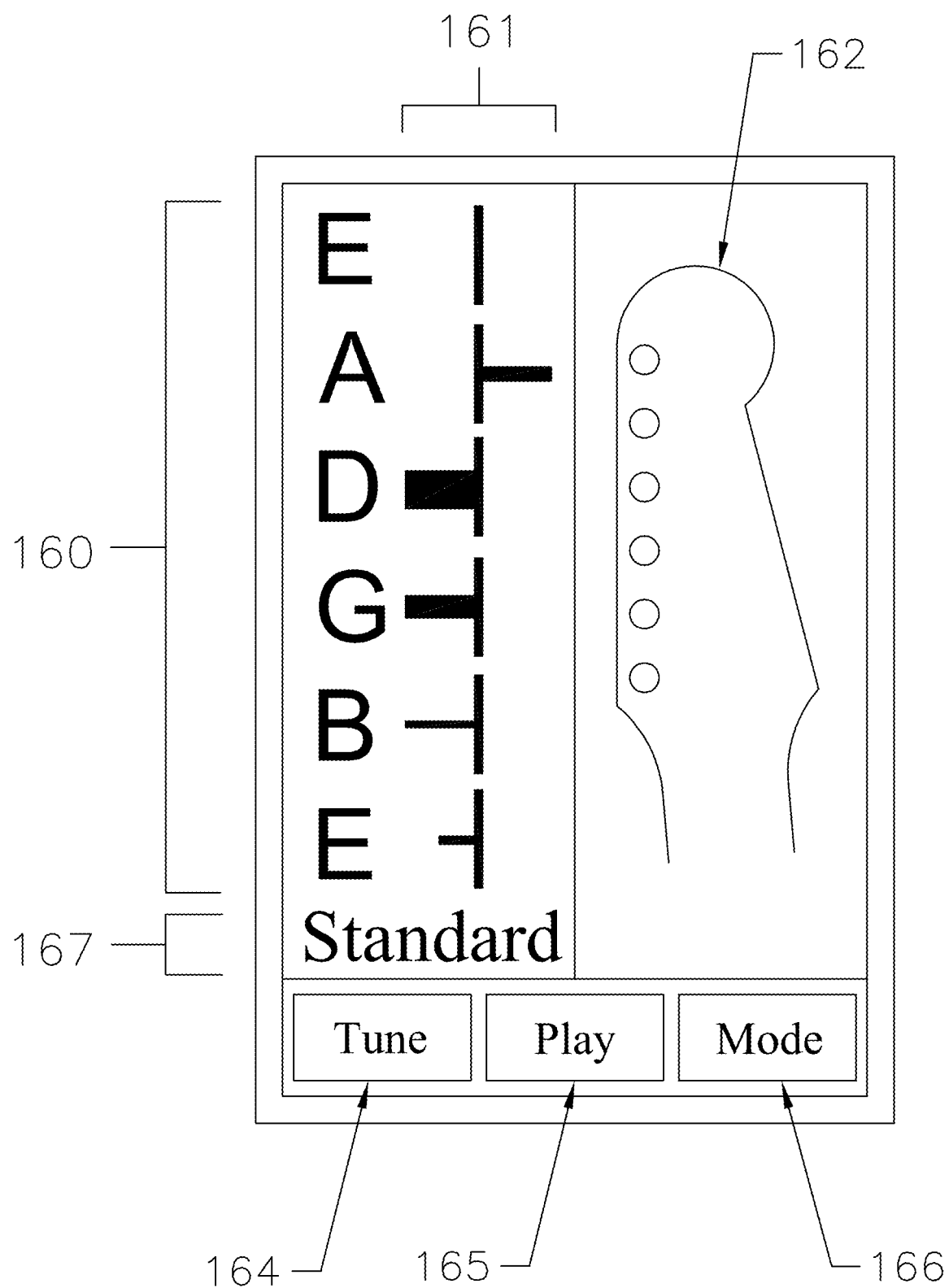
FIG. 16 shows a real-world embodiment of a graphical display for the tuning apparatus of the present application.

FIG. 16 shows a real-world embodiment of a display screen of a tuning apparatus of the present application. As shown, tuning letters 160 corresponding to the tuning of the strings, in accordance with the designated tuning (e.g., standard), are displayed adjacent to a respective graphical representation 161 of the tuning status of each string. For example, in the case of standard tuning, the letters 160 comprise E A D G B E from top to bottom, vertically. This graphical representation 161 reflects, for example, the graph embodiments shown in FIGS. 9 and 10B. For example, with reference to FIG. 9, as shown in FIG. 16, the width of the graph for each letter may vary depending on the tuning status (e.g., high, low, in-tune). Additionally, the color of the graphs of the graphical representation 161 can vary based on a tuning status of the associated string. In the case of the top-most "E", the flat line can be colored green, indicative of the string being perfectly in-tune, similar to graph 127 in FIG. 9. The remaining strings B G D A E may be colored yellow indicating that they are not perfectly in tune. The "B" string in FIG. 16 is similar to vertical line 132 in FIG. 9, indicating a low-tuning state. The "G" string in FIG. 16 is similar to graph 131 in FIG. 9, representing a high pitch that is very close to being out of range. The "D" string in FIG. 16 is similar to graph 130 in FIG. 9, representing a high pitch, but at a pitch level less than that of string "G". The "A" string in FIG. 16 is similar to graph 129 in FIG. 9, representing a high pitch, but at a pitch level less than that of string "D". The bottom-most "E" string in FIG. 16 is similar to graph 128 in FIG. 9, representing a high pitch, but at a pitch level less than that of string "A" (e.g., the bottom-most "E" string is close to being perfectly in-tune). The colors and shapes of the graphs are not limiting and any variety of colors and shapes may be incorporated so long as they clearly communicate tuning information to a user (e.g., colors that don't conflict with color perception of a color-blind user may be used). Also, similar to depiction 49 in FIGS. 6B and 10B, an image 162 of the head of the instrument is shown, wherein the layout of the letters 160 corresponds to the tuning pegs/knobs of the instrument head to further assist in tuning. There can also be various function buttons 164, 165 and 166 allowing a user to make various selections. For example, button 164 is a "Tune" button, button 165 is a "Play" button, and button 166 is a "Mode" button. Actuation of the "Tune" button 164 may initiate a tuning protocol such that detection of strumming/plucking of the strings is initiated in order to aid in tuning of the strings using the techniques described above. Actuation of the "Play" button 165 may initiate processing representative of the instrument being played (e.g., not actively being tuned) to deactivate aspects of the device that are used during active tuning. For example, actuation of the "Play" button 165 may shut down the display screen and the UV lights and/or sensors. Actuation of the "Mode" button 166 may initiate a mode selection process allowing a user to select from available modes of operation (e.g., selection of alternate tunings, etc.). For example, when "Mode" button 166 is actuated to select a standard tuning mode, "Standard" may be displayed at a tuning indication portion 167 of the graphical user interface (GUI) shown on the display, where tuning indication portion 167 is capable of displaying text indicating the tuning mode that is active or other informative wording. Of course, these button designations merely represent examples of how these buttons can be configured and are not limiting, as other functions can be mapped to the buttons. The real-world embodiment shown in FIG. 16 may, for example, be most preferably representative of a touch screen display (137) according to the embodiment shown in FIG. 15, but is not limited to such. For example, FIG. 16 may be representative of the display in the embodiments of FIG. 7 and FIGS. 13-14. The hardware (e.g., controller) and software of the wearable device are configured to control the display of information of the display screen of the remote device, including generation of the visualizations such as by techniques described above in connection with FIGS. 7 and 8, for example.

In view of the foregoing, it will be seen that the several advantages of the disclosure are achieved and attained. As described above, by using UV sensors to sense reflected UV light, the present device can be used in a live performance scenario (e.g., on stage under incandescent lights). In conventional light-detection based tuning devices, ordinary visible light is reflected from the strings and used for pitch determination. However, fluctuation of ambient incandescent and fluorescent lighting (caused by their alternating current (AC) power supply (e.g., at 120 Hz)), there are undesired 120 Hz signals, and it is necessary to pulse the sensor's light source at a high carrier frequency, in hopes that the resulting reflected signal will appear as an amplitude modulated (AM) signal at the output of the light sensor as the string vibrates in the light. The modulated signal could then be filtered to isolate it from the 120 Hz interference and demodulated with an envelope detector yielding the signal from the string vibration only. In practice this is extremely difficult if not impossible to achieve, since the vibrating string does not effectively modulate the light from the device's source and cannot reliably be filtered and extracted from the carrier wave. Also, the ambient light is often very high in intensity, as in the case with stage lighting, and can easily overpower the conventional device's light sources and the tiny amount of reflected light. The apparatus of the present application avoids these issues and represents a substantial improvement over such conventional techniques. The tuner and remote receiver/receiving display may be configured as a tuning kit, intended to operate with one another, and sold together or as separates (e.g., the embodiment shown in FIGS. 13 and 14 may be sold separately but used with the tuner module installed in the body of the instrument, and the embodiment shown in FIG. 15 may be sold separately but used with the tuner module installed in the body of the instrument). In other words, various embodiments of the remote/wearable device may each be used with the common tuner device installed in the body of the instrument. This gives a user flexibility to use a variety of remote/wearable devices with one common tuner module installed in the body of the instrument.

Additional advantages include but are not limited to (i) using discrete inputs and evaluating them simultaneously using embedded program interrupt routines, rather than complex filtering techniques, etc., (ii) displaying tuning information in the form of a representative instrument (e.g., guitar head) showing the actual location of the appropriate tuning pegs, (iii) mounting the present device semi-permanently or more preferably permanently to the instrument in such a manner that the present device is unobtrusive and need not be seen by the musician, thereby obviating the need to attach and detach the present device for each tuning during a performance, and (iv) cost efficient production, as the display and the bulk of the programming can be through a common smartphone device with a downloadable application.

In the present disclosure, all or part of the units or devices of any system and/or apparatus, and/or all or part of functional blocks in any block diagrams and flow charts may be executed by one or more electronic circuitries including a semiconductor device, a semiconductor integrated circuit (IC) (e.g., such as a processor, CPU, etc.), or a large-scale integration (LSI). The LSI or IC may be integrated into one chip and may be constituted through combination of two or more chips. For example, the functional blocks other than a storage element may be integrated into one chip. The integrated circuitry that is called LSI or IC in the present disclosure is also called differently depending on the degree of integrations, and may be called a system LSI, VLSI (very large-scale integration), or ULSI (ultra large-scale integration). For an identical purpose, it is possible to use an FPGA (field programmable gate array) that is programmed after manufacture of the LSI, or a reconfigurable logic device that allows for reconfiguration of connections inside the LSI or setup of circuitry blocks inside the LSI. Furthermore, part or all of the functions or operations of units, devices or parts or all of devices can be executed by software processing (e.g., coding, algorithms, etc.). In this case, the software is recorded in a non-transitory computer-readable recording medium, such as one or more ROMs, RAMs, optical disks, hard disk drives, solid-state memory, servers, cloud storage, and so on and so forth, having stored thereon executable instructions which can be executed to carry out the desired processing functions and/or circuit operations. For example, when the software is executed by a processor, the software causes the processor and/or a peripheral device to execute a specific function within the software. The system/method/device of the present disclosure may include (i) one or more non-transitory computer-readable recording mediums that store the software, (ii) one or more processors (e.g., for executing the software or for providing other functionality), and (iii) a necessary hardware device (e.g., a hardware interface). Additionally, any recitation herein of receiver/transmitter may be construed as transceiver, such that any unit with a receiver/transmitter is capable of transceiving.

The embodiments were chosen and described in order to best explain the principles of the disclosure and its practical application to thereby enable others skilled in the art to best utilize the disclosure in various embodiments and with various modifications as are suited to the particular use contemplated. Aspects of the disclosed embodiments may be mixed to arrive at further embodiments within the scope of the invention. For example, while permanently affixing the tuning apparatus to the instrument is one preferred embodiment, the tuning apparatus may also be removably or semi-permanently affixed to the instrument (e.g., for repairs or other maintenance, upgrades, etc.).

As various modifications could be made in the constructions and methods herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above-described exemplary embodiments, but should be defined only in accordance with the following claims appended hereto and their equivalents.

What is claimed is:

1. A tuning assembly for tuning a stringed musical instrument comprising a plurality of strings configured to vibrate, the tuning assembly comprising:
    a housing configured to be mounted to a body of the stringed musical instrument, the housing including a cavity and a plurality of slots;
    a printed circuit board stored in the cavity, the printed circuit board including a controller, a plurality of light emitters, and a plurality of light sensors, wherein the printed circuit board further includes a wireless transmitter, the controller is configured to transmit the dynamic tuning information to the wireless transmitter, the wireless transmitter is configured to receive the dynamic tuning information and wirelessly transmit data representative of the dynamic tuning information to a remote device associated with the wireless transmitter, the remote device being configured to receive the data, process the received data, and generate a dynamic graphical representation of the processed data on the remote device;
    wherein respective ones of the plurality of light emitters and light sensors are arranged as a plurality of emitter-sensor pairs comprising one light emitter and one light sensor per pair, and each emitter-sensor pair is positioned to protrude into a corresponding slot from amongst the plurality of slots of the housing, respectively, with each slot of the plurality of slots being positioned in a location underneath a respective string of the plurality of strings of the stringed musical instrument, the plurality of strings being configured to individually vibrate; and wherein each light emitter of the emitter-sensor pairs is configured to emit light of a certain frequency in a direction of a surface of a corresponding vibrating string of the stringed musical instrument, a portion of the emitted light from each light emitter is reflected from the surface of the corresponding vibrating string in a direction toward the corresponding light sensor, each light sensor is configured to sense the corresponding reflected light and generate a respective output representative of the corresponding reflected light for each vibrating string, and the controller receives and processes the outputs to independently and simultaneously determine a tuning property of each vibrating string, and, based on the tuning properties, generates dynamic tuning information for each vibrating string.

2. The tuning assembly according to claim 1, wherein the remote device includes a display, and the display is capable of displaying the dynamic graphical representation to a user of the stringed musical instrument, such that the dynamic graphical representation is usable by the user to assist the user in tuning the stringed musical instrument.

3. The tuning assembly according to claim 2, wherein the dynamic graphical representation includes a visualization that dynamically indicates a tuning status of each string of the stringed musical instrument based on the received data.

4. The tuning assembly according to claim 1, wherein each of the plurality of light emitters is an ultraviolet light-emitting diode, and each of the plurality of light sensors is an ultraviolet light photodiode or an ultraviolet light phototransistor.

5. The tuning assembly according to claim 2, wherein the remote device is one of a mobile device and a wearable remote display device.

6. A method of tuning a stringed musical instrument comprising a plurality of strings configured to vibrate, the stringed musical instrument further including a housing mounted to a body of the stringed musical instrument, the housing including a cavity and a plurality of slots, and a printed circuit board stored in the cavity, the printed circuit board including a controller, a wireless transmitter, a plurality of light emitters, and a plurality of light sensors, wherein respective ones of the plurality of light emitters and light sensors are arranged as a plurality of emitter-sensor pairs comprising one light emitter and one light sensor per pair, and each emitter-sensor pair is positioned to protrude into a corresponding slot from amongst the plurality of slots of the housing, respectively, with each slot of the plurality of slots being positioned in a location underneath a respective string of the plurality of strings of the stringed musical instrument, the plurality of strings being configured to individually vibrate, the method comprising:

emitting, via each light emitter of the emitter-sensor pairs, light of a certain frequency in a direction of a surface of a corresponding vibrating string of the stringed musical instrument, a portion of the emitted light from each light emitter being reflected from the surface of the corresponding vibrating string in a direction toward the corresponding light sensor;

sensing, via each light sensor, the corresponding reflected light;

generating, via each light sensor, a respective output representative of the corresponding reflected light for each vibrating string;

receiving, via the controller, the outputs;

processing the outputs, via the controller, to independently and simultaneously determine a tuning property of each vibrating string;

based on the tuning properties, generating dynamic tuning information for each vibrating string;

transmitting, via the controller, the dynamic tuning information to the wireless transmitter;

receiving, via the wireless transmitter, the dynamic tuning information;

wirelessly transmitting, via the wireless transmitter, data representative of the dynamic tuning information to a remote device associated with the wireless transmitter;

receiving and processing, via the remote device, the data; and generating, via the remote device, a dynamic graphical representation of the processed data on the remote device.

7. The method according to claim 6, the method further comprising: displaying, via a display of the remote device, the dynamic graphical representation to a user of the stringed musical instrument, such that the dynamic graphical representation is usable by the user to assist the user in tuning the stringed musical instrument.

8. The method according to claim 7, wherein the dynamic graphical representation includes a visualization that dynamically indicates a tuning status of each string of the stringed musical instrument based on the received data.

9. The method according to claim 6, wherein each of the plurality of light emitters is an ultraviolet light-emitting diode, and each of the plurality of light sensors is an ultraviolet light photodiode or an ultraviolet light phototransistor.

10. The method according to claim 7, wherein the remote device is one of a mobile device and a wearable remote display device.

11. A computer program product for a tuning device for tuning a stringed musical instrument comprising a plurality of strings configured to vibrate, the stringed musical instrument further including a housing mounted to a body of the stringed musical instrument, the housing including a cavity and a plurality of slots, and a printed circuit board stored in the cavity, the printed circuit board including a controller, a wireless transmitter, a plurality of light emitters, and a plurality of light sensors, wherein respective ones of the plurality of light emitters and light sensors are arranged as a plurality of emitter-sensor pairs comprising one light emitter and one light sensor per pair, and each emitter-sensor pair is positioned to protrude into a corresponding slot from amongst the plurality of slots of the housing, respectively, with each slot of the plurality of slots being positioned in a location underneath a respective string of the plurality of strings of the stringed musical instrument, the plurality of strings being configured to individually vibrate, the computer program product comprising:

a plurality of instructions resident on a non-transitory computer-readable recording medium, wherein the instructions are executable by a processor to cause the processor to control;

emitting, via each light emitter of the emitter-sensor pairs, light of a certain frequency in a direction of a surface of a corresponding vibrating string of the stringed musical instrument, a portion of the emitted light from each light emitter being reflected from the surface of the corresponding vibrating string in a direction toward the corresponding light sensor;

sensing, via each light sensor, the corresponding reflected light;

generating, via each light sensor, a respective output representative of the corresponding reflected light for each vibrating string;

receiving, via the controller, the outputs;

processing the outputs, via the controller, to independently and simultaneously determine a tuning property of each vibrating string;

based on the tuning properties, generating dynamic tuning information for each vibrating string;

transmitting, via the controller, the dynamic tuning information to the wireless transmitter;

receiving, via the wireless transmitter, the dynamic tuning information;

wirelessly transmitting, via the wireless transmitter, data representative of the dynamic tuning information to a remote device associated with the wireless transmitter;

receiving and processing, via the remote device, the data; and generating, via the remote device, a dynamic graphical representation of the processed data on the remote device.

12. The computer program product according to claim 11, wherein the instructions are executable by the processor to further cause the processor to control:

displaying, via a display of the remote device, the dynamic graphical representation to a user of the stringed musical instrument, such that the dynamic graphical representation is usable by the user to assist the user in tuning the stringed musical instrument.

13. The computer program product according to claim 12, wherein the dynamic graphical representation includes a visualization that dynamically indicates a tuning status of each string of the stringed musical instrument based on the received data.

14. The computer program product according to claim 11, wherein each of the plurality of light emitters is an ultraviolet light-emitting diode, and each of the plurality of light sensors is an ultraviolet light photodiode or an ultraviolet light phototransistor.

15. The computer program product according to claim 12, wherein the remote device is one of a mobile device and a wearable remote display device.

16. The tuning assembly according to claim 1, wherein the remote device is part of the tuning assembly.

17. The tuning assembly according to claim 1, wherein the tuning properties comprise pitch data of the plurality of vibrating strings.

* * * * *